United States Patent [19]
Seitz et al.

[11] Patent Number: 6,080,971
[45] Date of Patent: *Jun. 27, 2000

[54] FLUID HEATER WITH IMPROVED HEATING ELEMENTS CONTROLLER

[75] Inventors: David Seitz, 27285 Wells La., Conroe, Tex. 77385; Donald Kuhnel, Hobson, Tex.

[73] Assignee: David Seitz, Conroe, Tex.

[*] Notice: This patent is subject to a terminal disclaimer.

[21] Appl. No.: 09/241,185

[22] Filed: Feb. 1, 1999

Related U.S. Application Data

[63] Continuation of application No. 08/861,766, May 22, 1997, Pat. No. 5,866,880.

[51] Int. Cl.$^7$ ........................................ H05B 1/02
[52] U.S. Cl. ................ 219/483; 219/501; 219/492; 219/486; 219/509; 392/450; 392/485; 307/38
[58] Field of Search ........................... 219/492, 483–486, 219/501, 497, 508, 509, 506; 392/490, 485, 486; 307/38–41

[56] References Cited

U.S. PATENT DOCUMENTS

| | | |
|---|---|---|
| 3,787,729 | 1/1974 | Bennett . |
| 3,952,182 | 4/1976 | Flanders . |
| 4,333,002 | 6/1982 | Kozak . |
| 4,337,388 | 6/1982 | July . |
| 4,338,078 | 7/1982 | Lampkin . |
| 4,414,252 | 11/1983 | Lampkin . |
| 4,511,790 | 4/1985 | Kozak . |
| 4,567,350 | 1/1986 | Todd, Jr. . |
| 4,604,515 | 8/1986 | Davidson . |
| 4,638,147 | 1/1987 | Dytch et al. . |
| 4,829,159 | 5/1989 | Braun et al. . |
| 4,920,252 | 4/1990 | Yoshino . |
| 5,020,127 | 5/1991 | Eddas et al. . |
| 5,053,604 | 10/1991 | Escaravage et al. . |
| 5,216,743 | 6/1993 | Seitz . |
| 5,325,822 | 7/1994 | Fernandez . |
| 5,479,558 | 12/1995 | White, Jr. et al. . |
| 5,504,306 | 4/1996 | Russell et al. . |

FOREIGN PATENT DOCUMENTS 0 209 867 A2 | 1/1987 | European Pat. Off. .

*Primary Examiner*—Mark Paschall
*Attorney, Agent, or Firm*—Browning Bushman

[57] ABSTRACT

An electrically powered water heater includes a plurality of heating elements for substantially instantaneous heating of fluid passing through the heater. A controller for powering the plurality of heating elements is responsive to a temperature sensor in fluid communication with the heated fluid. The temperature sensor activates each of the plurality of heating elements for a predetermined period of time that is preferably no more than 32 half cycles. The controller activates a second heating element after a delay of preferably no more than 8 half cycles after activating a first heating element. The predetermined period of time for activating each of the plurality of heating elements may be substantially equal, such that each heating element contributes substantially equally to the heating of fluid. In one embodiment, the heater housing is provided with a plurality of chambers, and a heating element is provided within each of the plurality of chambers.

17 Claims, 19 Drawing Sheets

FLUID HEATER WITH IMPROVED HEATING ELEMENTS CONTROLLER

This application is a continuation of Ser. No. 08/861,766 filed May 22, 1997, now U.S. Pat No. 5,866,880.

FIELD OF THE INVENTION

The present invention relates to a water heater with a plurality of heating elements. More particularly, this invention relates to a flow-through or tank-less water heater with a plurality of heating elements each in a corresponding chamber, and to an improved controller for powering the heating elements.

BACKGROUND OF THE INVENTION

Flow-through water heaters, which are also referred to as tank-less or instantaneous water heaters, employ one or more chambers which are generally sized only slightly greater than the size of the heating elements, and are capable of instantaneously heating the water to a desired temperature as it flows through the heater. Flow-through water heaters have long been recognized as superior alternatives to conventional water heaters with large storage or holding tanks. The problems with prior art flow-through water heaters include the inability to provide a sufficiently responsive control for the powerful high wattage heating supply necessary to maintain desired temperatures for the wide range of conditions normally associated with domestic and commercial water heating applications. Particularly problematical has been the inability to prevent high temperature overshoot at no flow shutdown resulting from latent heat, as well as the rapid build up of mineral deposits within the water heater in hard water areas.

In order to be commercially successful, flow-through instantaneous or tank-less water heaters must have a plurality of high wattage heating elements and a control scheme which provides the ability to respond very quickly to changes in flow and pressure in order to maintain constant temperature control. In order that one better understands the difficulties associated with both tasks, it is necessary to address the obstacles inherent to flow-through heaters. First, it has been determined that fluid flow rates of at least 2.25 gpm at 120° F. are required to satisfy the lifestyle requirements of a typical residential application in most industrialized nations. Since water temperatures will range from 38° F. to over 90° F. depending upon the locale, source of water and season, the single source flow-through water heater requires a typical minimum fluid heating input capacity of at least 28,000 watts or approximately 95,000 BTU. In electric resistance type heating elements one should be concerned about watt density. High watt density elements have a much shorter service life than do low watt density elements. To obtain 28 KW and to maintain the benefits of a small heating systems, a water heater with multiple heating elements is preferred.

Much of the art before 1975 taught the use of fixed input heaters. Since domestic water heating applications require heating fluids at low (less than 1 gpm) to moderate (up to 3 gpm) flows, fixed input units had inherent limitations. In moderate flow conditions, there was sufficient water flow to absorb the heat and maintain a desirable temperature. At low flows, however, a high fixed input of heat would dangerously overheat the water, thereby creating potentially scalding conditions. The method of heating fluids in a fixed input, flow-through water heater thus limited the wattage and required flow activation devices that would prevent the activation of the heating elements until a safe minimum flow rate was achieved. Assuming the inlet water was 60° F. or more, fixed input heaters having a total 28 KW heat input would be very dangerous at flows less than approximately 2¼ gallons per minute. For the foregoing reasons, electric fixed input flow-through water heaters were generally limited to 9 KW (approx. 30,000 BTU), and best served as single point-of-use heaters.

In addition to the above problems, additional considerations that should be addressed in the design and development of a commercially acceptable flow-through heater for domestic water heating are described below.

Flow-through water heaters with multiple heating elements are designed to have small heat exchangers with a relatively high wattage to fluid volume ratio. As shown in the prior art, the flowing water absorbs and carries off the heat satisfactorily during the heating mode, but at shutdown the latent heat in the heating elements will raise the water temperature to very high levels. This condition is aggravated in the sequential or staged activation controls schemes shown in prior art. In these designs, the heating elements, which are generally located in individual heating chambers, are sequentially activated with a first heating element energized to full power followed, depending upon demand, with a downstream element energized to full power and so on until all the elements necessary to produce the resulting desired temperature were continuously activated. At no flow, shutdown would occur and the elements would be deactivated. In some control schemes, shutdown would be affected by the sequential deactivation of the heating means, by first shutting down the last heating element to be activated and then sequentially shutting down the remaining elements until all were deactivated. In either scheme, at least one or more elements would have been on at full power and contain a significant amount of latent heat which was then transferred to the very small amount of static water in the heat exchanger or individual chamber. The results would be a very high overheating of the elements most energized at shutdown, and thus the overheating of the adjacent fluid. This over-temperature rise at shutdown can result in potential scalding conditions, particularly in point-of-use heaters where the distance from the heater to the fluid dispenser is very short.

The hotter the element, the hotter the water is heated, and the more minerals are precipitated out. This is particularly a problem in hard water areas. Thus another disadvantage of the cyclic overheating of water at shutdown is the resulting accelerated precipitation and accumulation of mineral deposits on the overheated elements and in the heat exchanger. Because of the relatively small chambers used in flow-through heaters, mineral deposits will quickly accumulate under these conditions, thereby shortening the life of the heating element and/or heat exchanger. In addition to the accumulation of mineral deposits in the water heater, these deposits may be carried out with fluid flow through the fluid distribution line and into the filter screens of appliances and fixtures, such as dishwashers, clothes washers, and faucets, thus undesirably increasing the maintenance for such appliances and fixtures.

One of the principal objectives of flow-through water heaters is to rapidly heat water on demand. The most common (devices used for temperature sensing in the and the response time for these devices to sense a temperature change may be in the range of two seconds. When one couples this response time to the time it takes to heat a resistance heating element and then to heat the water before the thermistor is heated, the overall time lag has been determined to be approximately 7 seconds. Accordingly, the control systems in prior art flow-through water heaters are of a hunting-type controller, which are subject to relatively high degrees of hysteresis in operating temperature. The volume of 120° F. water required from a water heater to provide a normal shower, where the inlet water is 70° F., is approximately 1.5 gpm. A 28 KW heater has the capacity to heat water flowing at 1.5 gpm through the water heater at approximately 2 degrees per second. The problems associated with a 7 second lag and the potential problems associated with overheating as described above are compounded in flow-through heaters having multiple high wattage heating means.

Almost everyone is familiar with the effects of the water temperature of a shower when a competing fixture is opened. When one is using a heated water supply source having relatively constant temperature, such as a storage tank heater, it is relatively easy to simply adjust the ratio of hot to cold water to resume desired temperature. This is not so with a flow-through water heater utilizing control systems having a high degree of hysteresis. The response time lags the temperature effects associated with rapid changes in flow rate, and annoying temperature swings result. Since pressure changes affect flow rate, the same annoying temperature swings apply to pressure changes. One commonly experiences pressure changes when using a private water well as the supply source. Even in community or city water supply systems, one can experience significant fluctuating pressures in high water demand periods.

When a flow-through water heater is serving multiple fixtures through normal runs of distribution piping, the piping serves to buffer temperature changes. When the heater overshoots temperature, part of the heat is absorbed by the piping and mixed with the flowing water to reduce the affects of small temperature swings. The same is true when the heater control system, as a result of hysteresis, undershoots the desired temperature. If the flow-through heater had been delivering water above set point, the pipes would have absorbed part of the heat and could be at a temperature above set point. When the heater then undershoots, the cooler water in part mixes with the hotter water and the excess heat in the piping is also transferred, in part, back to the water. This buffering effect can be beneficial in domestic water heater applications as piping runs from the heater to the fixture can easily be 30 ft or more.

Because power distribution systems are subject to high voltage transients and power surges, it is important for system reliability to provide protection to the triacs or other electronic solid state power control switching devices. Most commonly, this protection has been provided in the prior art by surge protectors having metal oxide varistors. These devices are wattage limited and are subject to destruction by large transients.

U.S. Pat. Nos. 5,216,743; 5,020,127; 4,604,515; 4,567,350; 4,511,790; 4,333,002; 3,952,182; and 3,787,729 recognize the benefits of multiple heating elements in a water heater, as well as the benefits of sequential or staged activation of the heating elements to provide better temperature control during operations. U.S. Pat. Nos. 5,216,743 and 5,020,127 included control systems which used sequential or staged modulation of the heating elements energized at zero crossing to reduce hysteresis in the temperature control as well as interference in the lighting circuits. U.S. Pat. No. 4,337,388, and European Patent EP 0 209 867 A2 recognize the need for better temperature control to avoid overheating and employed anticipation circuitry and modulating control. U.S. Pat. No. 3,952,782 and the cited European patent disclose initial venting of the heating chamber at or before start up of operation. U.S. Pat. No. 5,216,743 disclosed that gasses are produced during the heating process, and utilized continuous venting of the gasses to prevent damage to the heating elements or heating chamber, and to reduce the possibility of dangerous overheating during operations if the temperature sensor is deprived of fluid communication.

Most commercial therimistors reqiuire approximately 2 seconds to respond to full temperature change. This time may be referred to as the thermistors time constant. In a flow-through water heater wherein the thermistor is heated secondarily as a result of thermal lag, a system response delay occurs. The thermal lag is inherent since the heating element must be heated before heating the fluid to which the thermistor is responsive. In a flow-through water heater of the type disclosed herein, the system time constant required for the thermistor to respond to the full temperature change is approximately 7 seconds. Heating elements in prior art heaters are activated one at a time and sequentially, with a first heating element first being fully and continuously activated. The temperature change resulting from the activation of the first heating element is compared to reference set point voltages from which a demand signal is generated. The extent of reported demand is a function of the system temperature time constant. As the demand increases in relationship to the temperature changes and system time constant, indicating the need for additional heating, successive heating elements are sequentially activated from zero power to full continuous activation at 100%. Heating elements may be added until a sufficient number of elements are activated to achieve set point, as disclosed in U.S. Pat. No. 5,020,127. In most applications, fewer than the total number of elements are activated to achieve set point so that the duty cycle of the initially activated heating element is significantly greater than the final activated heating element. The activated heating elements are thus disproportionately hotter than in the areas in which the heating elements are not activated. As heating elements are de-energized in the reverse order to shutdown, hot spots occur as one or more elements are energized at full power in no flow conditions. Over time, the effects of this imbalance of heat distribution can damage the heat exchanger and significantly reduce the service life of the overworked heating elements. The resulting localized over-temperature resulting at shutdown will cause excessive precipitation of mineral deposits in hard water environments.

The disadvantages of the prior art are overcome by the present invention. An improved water heater is hereafter disclosed which utilizes a controller for more desirably regulating power to each of a plurality of heating elements. The techniques of the present invention are particularly well suited for use in a flow-through or tank-less water heater having multiple chambers therein each having one of the plurality of heating elements.

SUMMARY OF THE INVENTION

The present invention provides a flow-through or tank-less water heater having multiple heating elements powered by one or multiple power supplies. The flow-through water heater includes an improved control system, including temperature sensing circuitry and anticipation circuitry. The control system is coupled to temperature sensor devices whose output is modified by circuitry to compensate for the time constants related to thermal lag normally associated with the temperature sensing of a continuously heated fluid at varying flow rates, thereby providing time corrected instantaneous temperature readings. The control system also includes an improved anticipation and temperature sensing circuitry which precisely controls the energization of the heating elements based on time/rate constants. The supply source of electrical power to the heating elements is controlled by the logic of the control system.

Power is first coupled to the control system by the engagement of relays, and then the heating elements are incrementally energized/de-energized by means of triacs, which are activated by zero crossing trigger devices. The control system includes logic and a solid state controller to alternate the incrementation or decrementation of the energization of each heating element in increments as small as an electrical half cycle. The incrementation or decrementation of the power to the heating element is controlled in such a fashion that each heating element receives equal power from the electrical supply distributed by the controller in sequential increments of the half cycles of the sine wave. A first heating element is first activated or deactivated at the zero crossing of an electrical half cycle. The successive and remaining heating elements then receive alternately half cycle activation or deactivation at the subsequent half cycle zero crossing, so that the power supplied to the heating elements is shared in approximately equal increments, thereby continuously equalizing the duty cycle of each element during operations and controlling the increased or decreased amount of instantaneous coincident activation of the collective heating elements to very small increases or decreases in power. It is through this power sharing that the electrical load to the heating elements is almost perfectly balanced (in both single phase and three phase power supplies), thereby reducing or effectively eliminating the interference normally resulting from the energization of high wattage heating elements to the lighting circuits and preventing transformer biasing. Furthermore, this power sharing technique minimizes hot spots within the heating system. Through proper wattage sizing of the heating elements, most water heating applications will require less than 50% of full power to the elements, and each heating element receives substantially equal activation during operation. At shutdown, the latent heat in any heating element is normally one-half or less than in the prior art sequentially staged heating schemes where one or more of the elements is normally activated at full power. At shutdown, the temperature overshoot resulting from latent heat in the elements, as well as mineral deposit buildup related to such overheating, are substantially reduced and heating element life in increased.

It is an object of this invention to provide a water heater with a controller which regulates the alternating equal incrementation and or decrementation of energy to the heating elements in a power sharing fashion to improve temperature sensing and control response for better temperature control in operation. It is a related feature of this invention to provide a flow-through water heater which includes a control system which energizes the heating elements equally in a continuous, power-sharing fashion.

It is also an object of this invention to provide a water heater controller for energizing multiple heating elements alternately in such a manner that the power is shared by each element, thereby reducing the latent heat at no flow shutdown in each element for most if not all applications. A related feature is to provide a flow-through heater in which the heating elements are activated in a power sharing fashion such that at no flow shutdown the latent heat in all the elements are distributed equally. By reducing the latent heat in each heating element, the shutdown temperature of each element is reduced and evenly distributed to the adjacent fluid, thereby reducing the amount of minerals precipitated and deposited on the elements or within the heat exchanger. It is thus a feature of this invention to provide a flow-through water heater in which mineral deposit accumulation and build up are minimized.

It is also a feature of this invention to control the incrementation and decrementation of energy to high wattage heating elements in the power sharing manner and in increments as small as electrical half cycles in order to reduce the simultaneous, instantaneous coincidence of electrical loading to the heating elements thereby virtually eliminating interference with lighting circuits and transformers. It is a related feature of this invention to provide a flow-through water heater which includes a control system that provides energy to each heating element in a power sharing fashion so that energization of each element is alternately added or withdrawn in very small pulses of energy and evenly to each element.

Still another feature of the invention is a water heater which provides enhancements to temperature sensing and anticipation circuitry to overcome thermal lags in sensing and response time necessary for smooth and rapid achievement of set point and for rapid shutdown in no flow conditions. The flow-through water heater preferably includes a control system which incorporates enhanced temperature sensing and anticipation circuitry and/or logic to both provide smooth and rapid achievement of set point with a minimum of hysteresis, and to provide rapid shutdown in no flow conditions without the use of mechanical no flow detection devices.

Still another feature of this invention is a water heater with a power sharing control scheme whereby the heat elements are supplied power from multiple supply sources. All the heating elements of a flow-through water may each be energized by one of multiple power supply sources.

Yet another feature of this invention is a controller for a water heater which provides a balanced load for multiple incoming power supplies, particularly in the use of three phase power. A flow-through water heater may be controlled in such a fashion that the incoming power supply demand is balanced.

Still another feature of this invention is to provide power surge protection for a water heater that isolates the triacs or other power control switching devices from destructive voltage transients from the power supply. Isolation during standby conditions is obtained by using relays in selecting devices that are normally open, thereby eliminating power to the triacs during this standby condition.

It is an advantage of this invention that the flow-through water heater includes a control system which utilizes a microcontroller to accomplish the system control functions of the water heater.

A significant advantage of this invention is that consumers will more readily accept flow-through water heaters due to the advancements of the control system.

Yet another advantage of this invention is the relatively long life and the low service costs of a flow-through water heater according to this invention.

These and further objects, features and advantages of the present invention will become apparent in the following detailed description, wherein reference is made to the figures in the accompanying drawings.

DETAILED DESCRIPTION OF THE PREFERRED EMBODIMENTS

Figure 1:
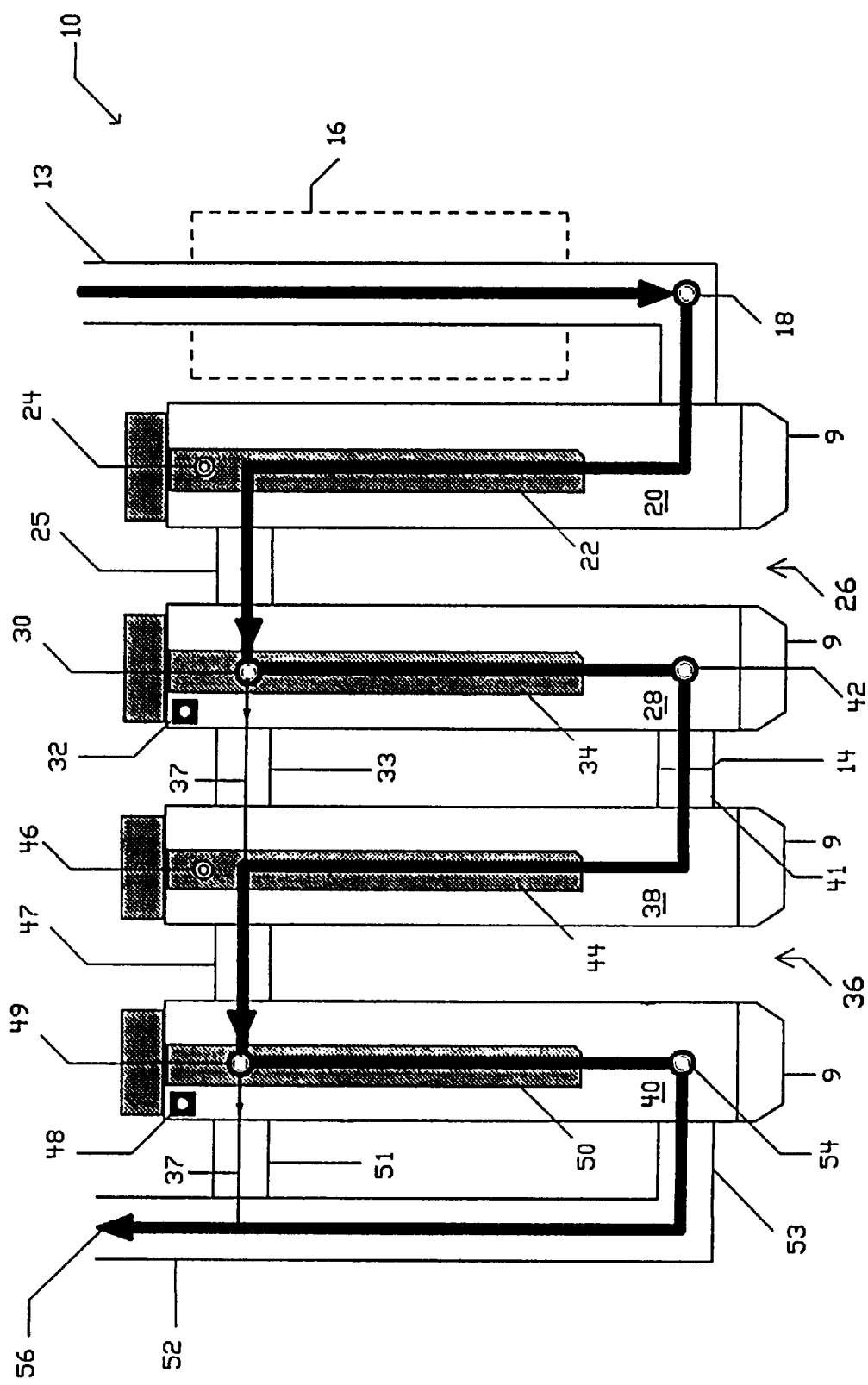
FIG. 1 generally depicts a multiple chamber flow-through water heater according to this invention.

FIG. 1 depicts the general configuration of one embodiment of a multiple chamber flow-through water heater 10 according to this invention. The water heater includes two substantively identical two-chamber modules 26 and 36 joined together at flanged connection 14. A suitable water heater may employ a single chamber module, but preferably combines two or more two-chambered modules in series with suitable flanged connections therebetween as discussed subsequently.

During operation, water flowing through the inlet line 13 and attached heat sink 16 keeps the solid-state heater control switching devices described subsequently at a safe operating temperature. The water inlet temperature is monitored by a thermistor 18 mounted either at the bottom of the water inlet line 13 or within a chamber upstream from the first heating element. Water flows into the bottom of first chamber 20, flowing upward and in contact with heating element 22. At the top of chamber 20, the water Now is monitored for an over-temperature condition by high temp limit or limit switch 24. The flow proceeds through a reduced-aperture fluid coupling 25 connecting chamber 20 of module 26 with chamber 28 of module 26. The water is mixed by the increased velocity as it is discharged from the restricted-aperture coupling 25 into the top of chamber 28. At the top of chamber 28, the water temperature is measured by thermistor 30. Water level is monitored by level detector 32 at the top of chamber 28. Flow proceeds downward through chamber 28 and in contact with heating element 34.

Gasses at the top of chamber 20 flow horizontally from the outlet of the reduced-aperture fluid canal coupling 25 then into chamber 28, thence through the vent aperture 37 in the flanged coupling 33 connecting module 26 and module 36. Gasses then continue to flow horizontally into chamber 38 of module 36. A very small amount of water follows the flow of gas. Further details regarding the heat sink 16, the restricted couplings and venting between the modules is disclosed in U.S. Pat. No. 5,216,743.

At the bottom of chamber 28 of module 26, water temperature is measured by thermistor 42. Water is mixed as it flows through the reduced-aperture fluid canal coupling 41 between chamber 28 and chamber 38. After entering the bottom of chamber 38, the water flows upward and in contact with heater 44, monitored for high temperature by high temp limit 46. Gasses continue to flow horizontally from the top of chamber 38 through the reduced-aperture fluid coupling 47 connecting the top of chamber 38 with the top of chamber 40. Water is again mixed as it flows through the reduced-aperture fluid coupling 47 between chambers 38 and 40. Water temperature is measured at the top of chamber 40 by thermistor 49, and water level is monitored in the top of chamber 40 by level detector 48. Water temperature is also measured at the bottom of chamber 40 by thermistor 54. Fluid flow proceeds downward and in contact with heater 50, while gasses continue to flow horizontally from the top of chamber 40 through the outlet vent aperture 37 in the coupling 51, and into the fluid outlet line 52. Gasses are then mixed with the outlet fluid and together with the heated fluid is discharged from the heater 10. Gas is vented from each of the heating chambers continuously during operation. A small amount of fluid is discharged with the gas through the vent aperture 37 in coupling 51. The temperature may be measured by locating thermistor 54 at the bottom of chamber 40 as shown, or by alternatively locating thermistor 54 within the fluid outlet line 52. Water is further mixed by providing reduced-aperture fluid coupling 53 for discharging the water from chamber 40 into the outlet line 52 then upward along the length of the water outlet line 52 to the fluid outlet 56.

It can be seen that there are five thermistors in the hot water heater system. Thermistors 42 and 54 are located at the bottom of the heater chambers. Thermistors 30 and 49 are located at the top of the chambers 28 and 40, respectively, and thermistor 18 is positioned at the bottom of inlet line 13. The number and position of these thermistors are the primary measurement means for controlling the heater system. It should be obvious to one skilled in the art that the numbers and positions shown represent a preferred embodiment, but both the number and position of the thermistors or other temperature sensing devices, as well as their control temperatures, may be changed depending upon the applications requirements.

High temperature limits 24 and 46 are located in the top of chambers 20 and 38. Limits 24 and 46 are preset thermal switches, normally closed (normally making electrical contact), that open (to break the electrical connection) only when a preselected high temperature condition is present. Once a switch opens it remains open until it is manually or automatically reset to close the switch. Again, it would be understood that the number and position of the high limit switches may be changed depending upon the application.

The limit switches 24 and 46 are wired in series with the control signal for eight relays. The relays break both sides of the power line to all four heater elements, regardless of any control logic command that may be present from the electronic control system. This is a mechanical backup for sensing a high temperature condition. In the event of a high temperature condition, the limit switch must be manually or automatically reset before the heater will operate again. The relays are principally used as safety and surge protection devices, and the use and the number of such devices will be determined by the objective of the heating system.

Water level detectors 32 and 48 sense the water level in modules 26 and 36, respectively. In the event the water level drops below the height of the water level detectors, all the control relays are de-energized by breaking both sides of the power line to each of the four heater elements. If the water level in module 36 only drops below its level, heating elements 22, 44 and 50 are preferably disconnected from the power line by the control relays. If the water level in module 26 only drops below its level, heater 34 is preferably disconnected by its control relays. When heater 34 is disconnected, heaters 22, 44 and 50 cannot be energized from the control logic, as discussed subsequently. The use of water level sensing circuitry and sensors is primarily for safety purposes. The use of such circuitry and sensors, and the numbers and location of the sensors, will preferably be determined by the particular application.

Still referring to FIG. 1, the vent aperture 37 in the coupling 33 between the top of modules 26 and 36, and the vent aperture 37 in the coupling 51 between the top of module 36 and the water outlet line 51 allow entrapped air to be continuously removed from each of the heating chambers in the water heater 10. This feature is accomplished while simultaneously allowing the water to reach its proper level in the chambers, thereby preventing damage to the heaters.

A sediment bowl 9 is removably attached to the housing which defines each of the heating chambers 20, 28, 38 and 40. Each sediment bowl 9 may be substantially transparent to allow the operator periodically to visibly determine service requirements for the heater. Each bowl 9 may be connected by conventional threads to its respective housing, thereby facilitating easy removal and replacement for draining and cleaning the heating chambers.

Figure 2:
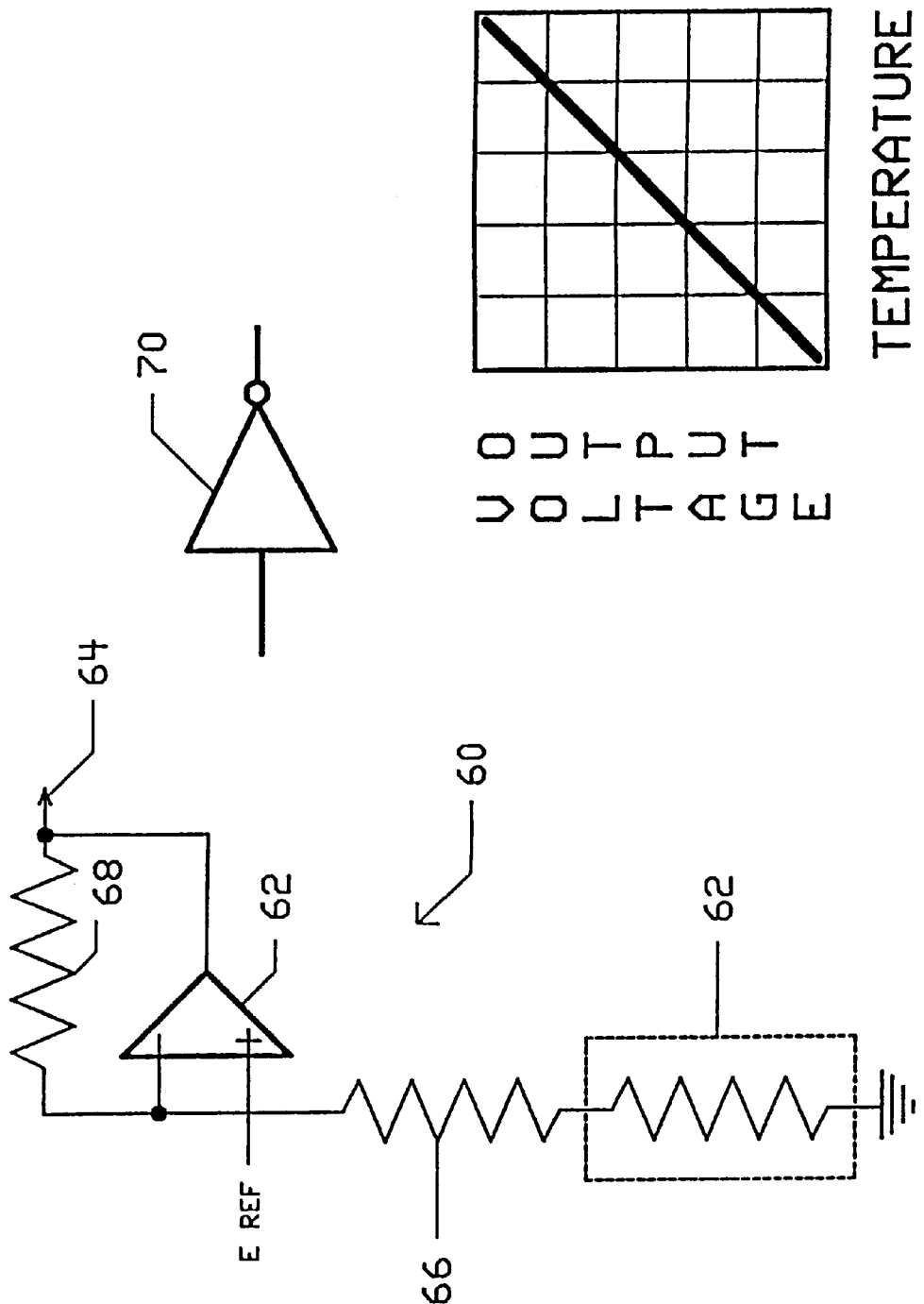
FIG. 2 illustrates a temperature amplifier, circuit logic and a voltage output to temperature graph according to this invention.

FIG. 2 discloses a suitable temperature amplifier circuit 60. Each of the five system thermistors 62 is preferably connected to its own amplifier circuit. The operational amplifier 63 converts the negative resistance thermistor to a linear positive voltage output 64 of approximately 30 millivolts per degree F within the working temperature range of the water heater. The voltage output 64 is thus proportional to the sensed temperature. FIG. 2 depicts the linearity between voltage output and temperature. The circuit 60 includes appropriately sized scale resistor 66 and gain resistor 68.

Figure 3:
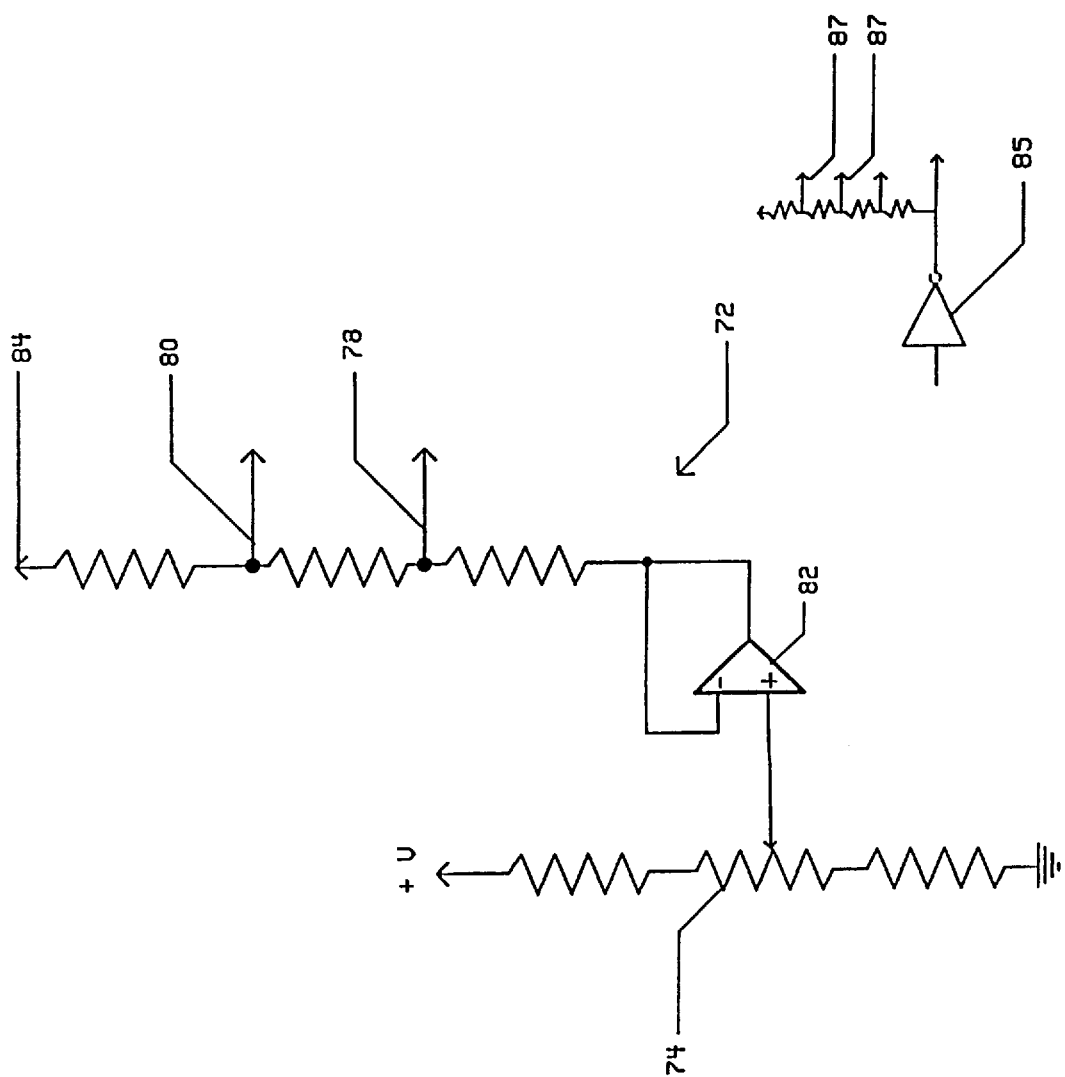
FIG. 3 illustrates a suitable set point circuit according to this invention.

The amplifier set point circuit 72 as shown in FIG. 3 allows the user to set the output temperature of the hot water heater 10. Temperature is set by means of a manually adjusted potentiometer 74. The set point circuit establishes two separate reference voltages 78 and 80, i.e., a high temp shutdown voltage 78, and the control set point operational voltage 80. In the preferred embodiment, the circuitry also provides a minimum standby set point temperature in order to prevent freezing. The circuit 72 includes an operational amplifier 82. The voltage 84 is connected to a respective inlet temperature amplifier 63 disclosed above. The set point circuit 72 thus provide the voltage inputs 80 and 78 to the shutdown circuit and the pulse width modulator, as described subsequently.

Figure 4:
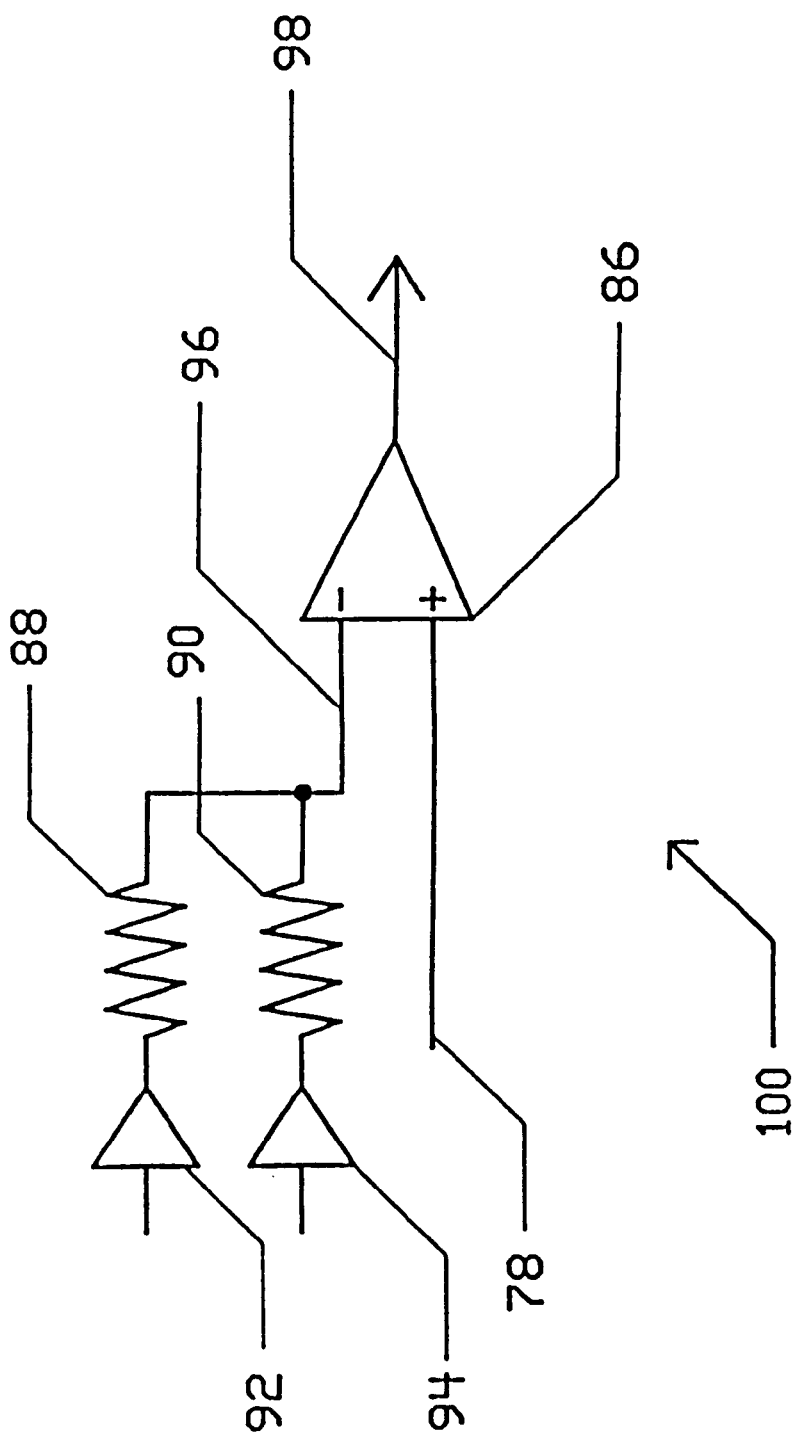
FIG. 4 depicts an exemplary shutdown circuit according to this invention.
Figure 10:
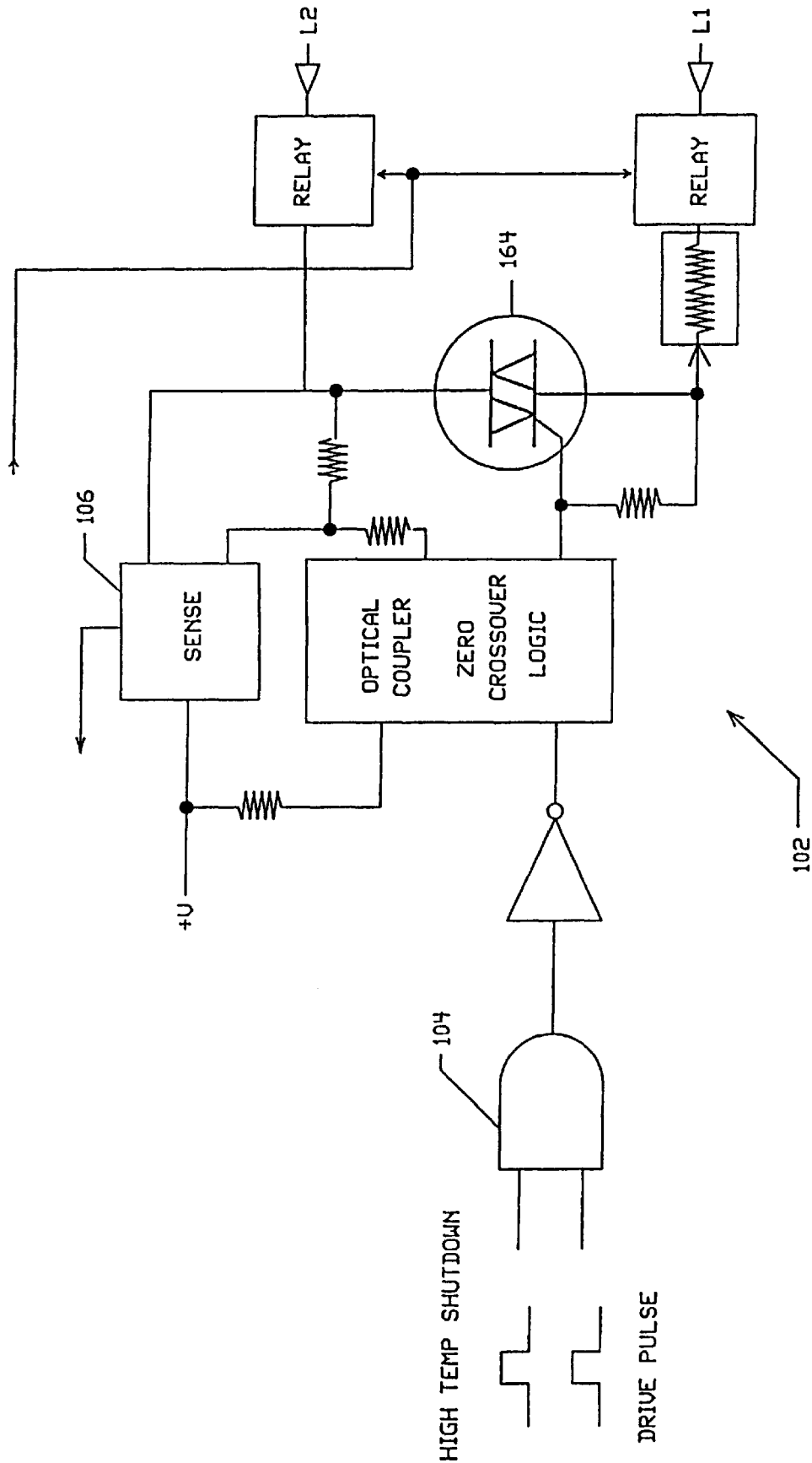
FIG. 10 depicts an optionally coupled heater driver for a selected control function heating element.

The high temperature shutdown voltage 78 is one input to the operational amplifier comparator 86 of the shutdown circuit 100, as shown in FIG. 4. Temperature amplifiers 92 and 94 through rationing resistors 88 and 90 provide the second input 96 to the comparator 86. The output voltage 98 of the comparator is high when the fluid temperature in chamber 28 and chamber 40 are below the high temperature shutdown voltage. When either chamber or both chambers exceed the high temperature shutdown voltage, the comparator output voltage 98 drops to zero, disabling the AND gate 104 as shown in FIG. 10. This inhibits the heater element 34 by control circuitry as shown in FIG. 10, and as described subsequently.

Heater 34 as controlled by the control circuit 102 as shown in FIG. 10 may be considered the sense heater, as its operation initiates the control sequence to all the other heating elements 22, 44 and 50. When the shutdown comparator 86 as shown in FIG. 4 output voltage goes to zero, heater 34 is inhibited (the control sense heater). By inhibiting the command voltage pulses from the pulse width modulator to heater 34, through the AND gate 104 as shown in FIG. 10, all other heaters are disabled (no signal to the sense circuitry 106 as shown in FIG. 10). Any of the heaters may be used to provide the desired control or sense heater, depending upon the application. The shutdown comparator 86 will stay in a shutdown condition as long as the output voltage from the temperature amplifiers of chamber 28 and chamber 40 (see FIG. 1) are greater than the high temperature shutdown voltage.

Figure 5:
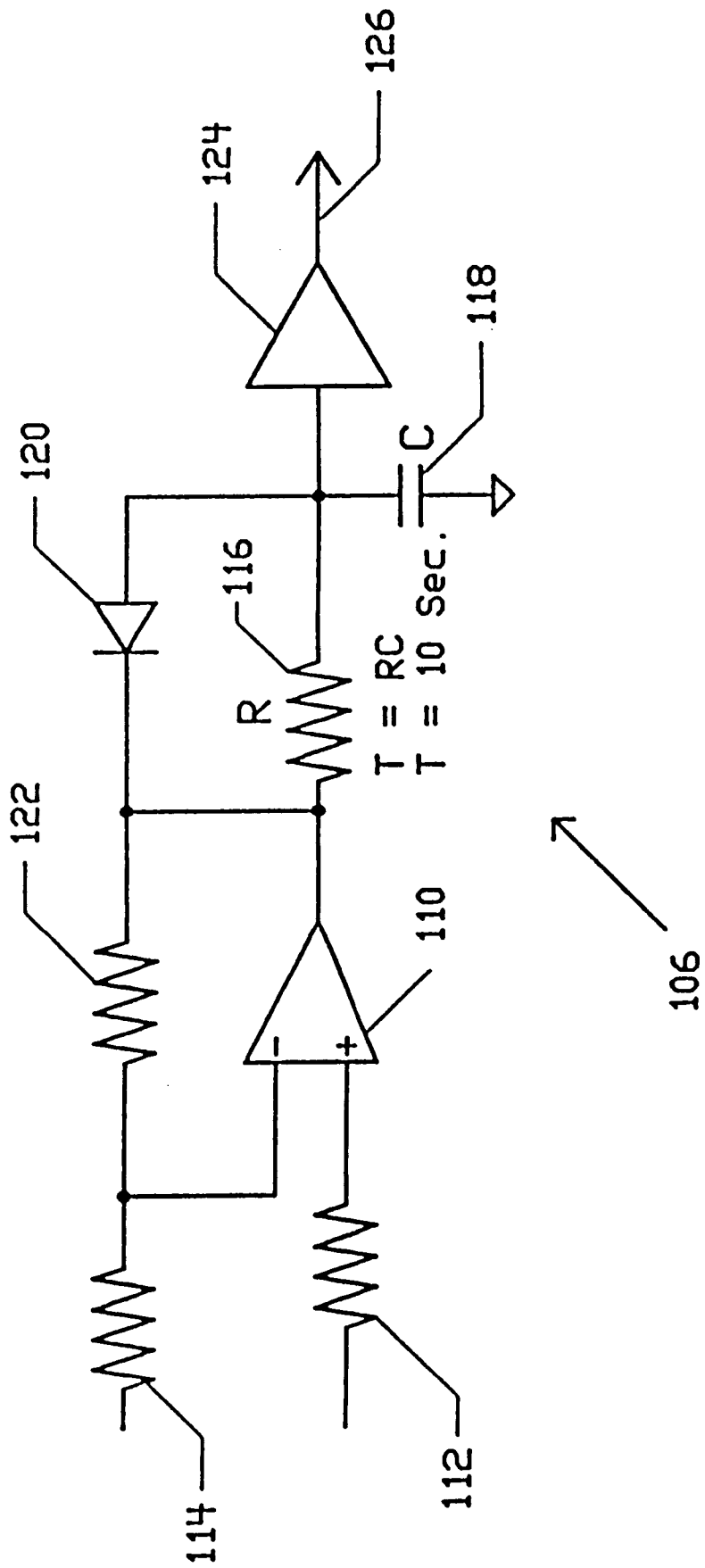
FIG. 5 depicts an exemplary standby circuit according to this invention.
Figure 12:
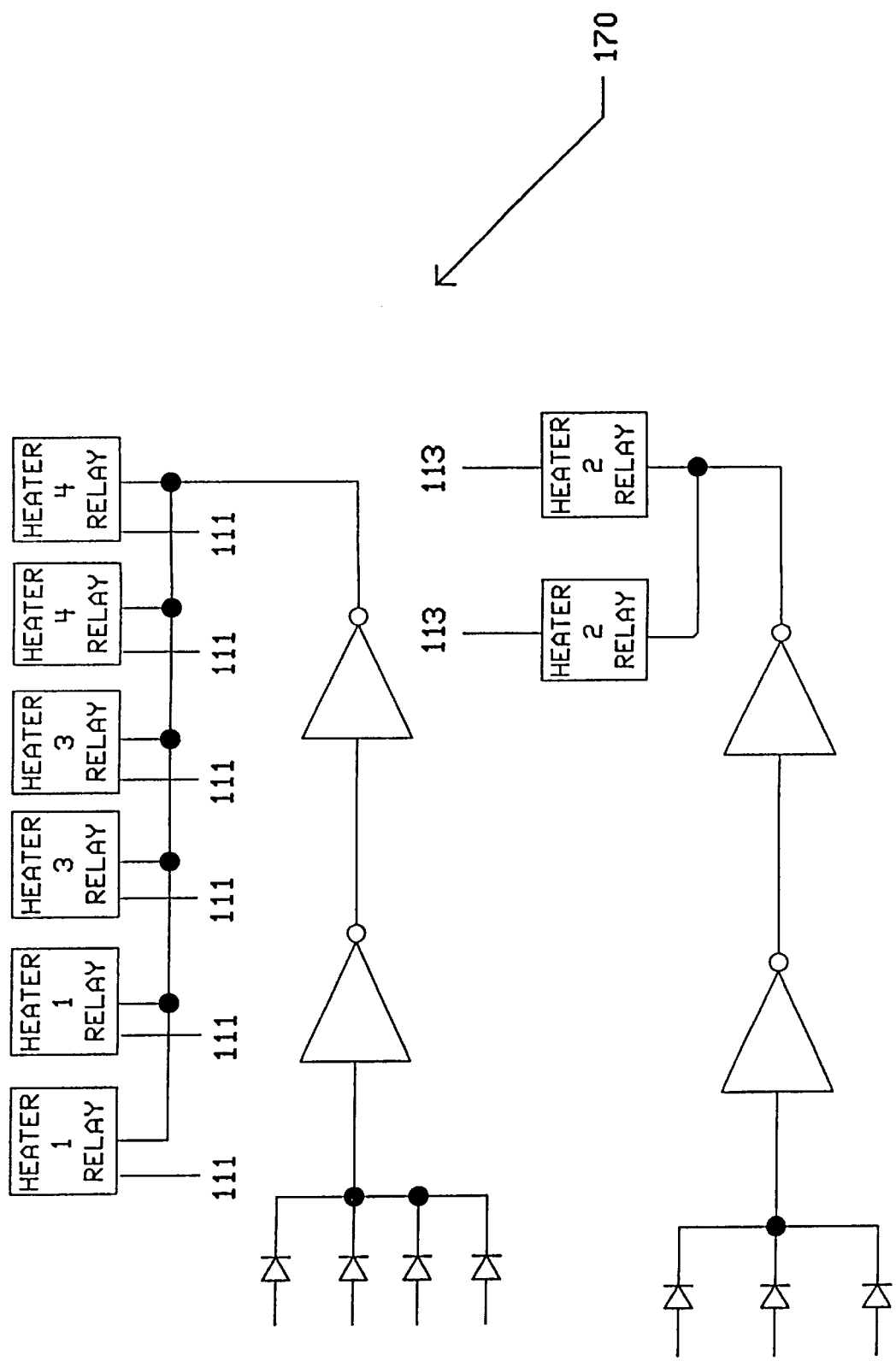
FIG. 12 depicts a control circuit for relay drivers.
Figure 13:
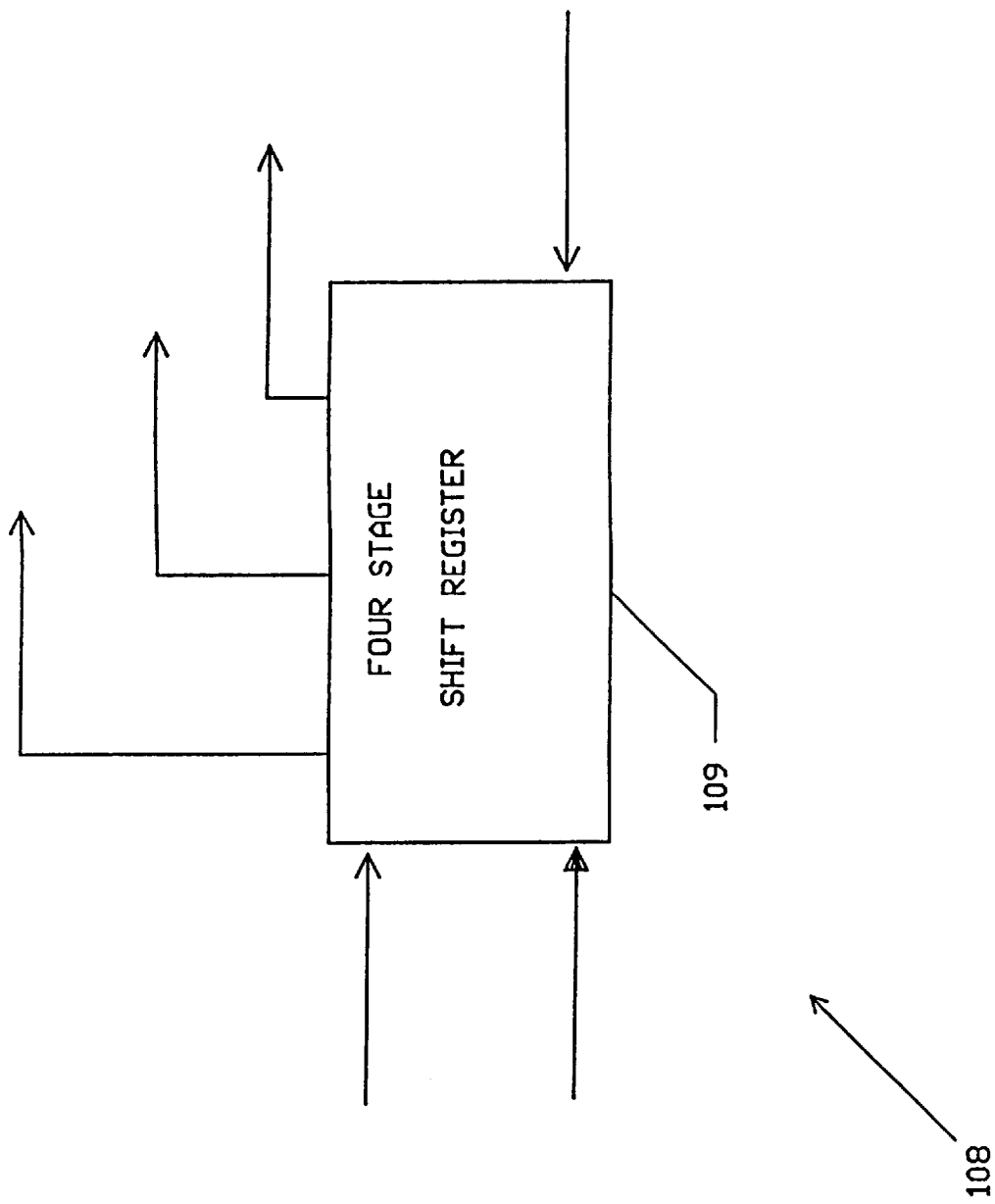
FIG. 13 depicts a suitable shift register control.

The standby circuit 106 as depicted in FIG. 5 compares the voltage difference (indicative of temperature) between thermistor 30 mounted in the top of chamber 28 and thermistor 42 mounted in the bottom of chamber 28. The voltage from each thermistor passes through an appropriate resistor 112 and 114, respectively. The circuit 106 also includes resistor 116, capacitor 118, quick discharge member 120, resistor 122, and amplifier 124. The output 126 from the circuit 106 is fed to the shift register 109, as shown in FIG. 13. The output voltage of the standby circuit goes to a high voltage level when thermistor 30 is just a few degrees warmer than thermistor 42 as indicated by the standby comparator circuitry 106. This high level output voltage inhibits a shift register 109 that sequences the activation of heaters 22, 44 and 50 by means of the shift register control circuitry 108 as shown in FIG. 13. Operation of the shift register will be explained below. The high output voltage level from the standby comparator 110 as shown in FIG. 5 also de-energizes control relays 111, as shown in FIG. 12, associated with heating elements 22, 44 and 50.

Under normal operation with water flowing through the heater 10, each chamber is successively hotter than the preceding chamber. Chamber 40 is thus hotter than chamber 38, which is hotter than chamber 28, which is hotter than chamber 20. When the water flow is interrupted, latent heat in all the heaters will raise the temperature of the fluid within the chambers. The top of each chamber is hotter than the bottom of the same chamber during no flow conditions (thermocline). The standby circuit comparator circuitry 100 as shown in FIG. 4 detects this condition and effectively de-energizes heating elements 22, 44 and 50. The pulse width modulator as described below maintains chamber 28 at a reduced set point temperature while keeping the top of chamber 28 hotter than the bottom of chamber 28, thereby maintaining the high voltage level output from the standby circuitry 106 as shown in FIG. 5 and keeping the heater 10 in a standby state.

When flow is re-established through the water heater 10, the temperature sensed by thermistor 30 approximates the temperature sensed by thermistor 42. Output voltage from the standby circuit comparator 110 changes to a low level, enabling the shift register 109 which initiates the energizing of the control relays 111 associated with heating elements 22, 44 and 50. The control circuit logic is thus switched from the standby mode to the operational mode, and the set point is returned from the standby set point to the operational set point. The heaters are activated in response to demand, incrementally seeking the operational set point temperature. If the water heater 10 is receiving preheated water above the operating set point, the control will remain in the standby mode.

Figure 7:
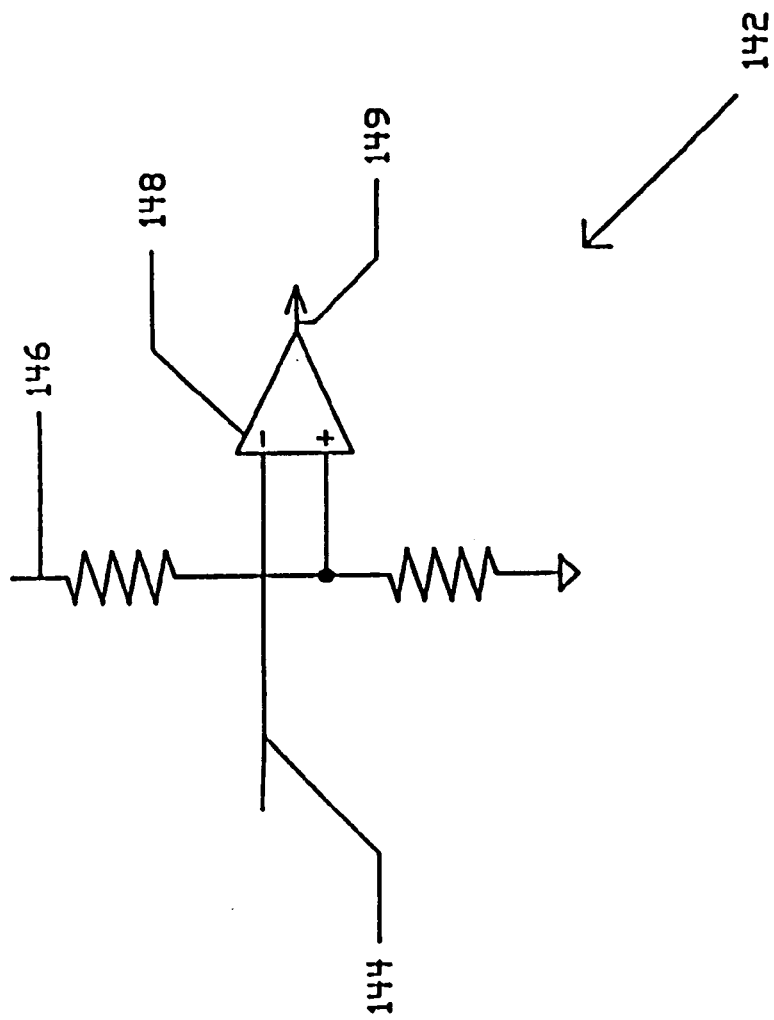
FIG. 7 depicts a modulation detector.

By comparison of the temperature differentials as discussed previously, in the presence and/or the absence of thermocline conditions, the standby circuit comparator 106 detects the starting and stopping of fluid flow through the heater 10. When the top of chamber 28 approximates the temperature sensed at the bottom of a downstream chamber, the output of the standby circuit 106 goes to the zero state, taking the hot water heater 10 out of the standby mode. The shutdown circuit 100 as shown in FIG. 4 will be in the high state at this time, and the circuitry will indicate a flow condition. When flow detection occurs, the modulation circuitry as shown in FIG. 7 output 149 drops to the zero state, all of the control relays are energized, and the shift register 109 as shown in FIG. 13 is enabled.

Figure 6:
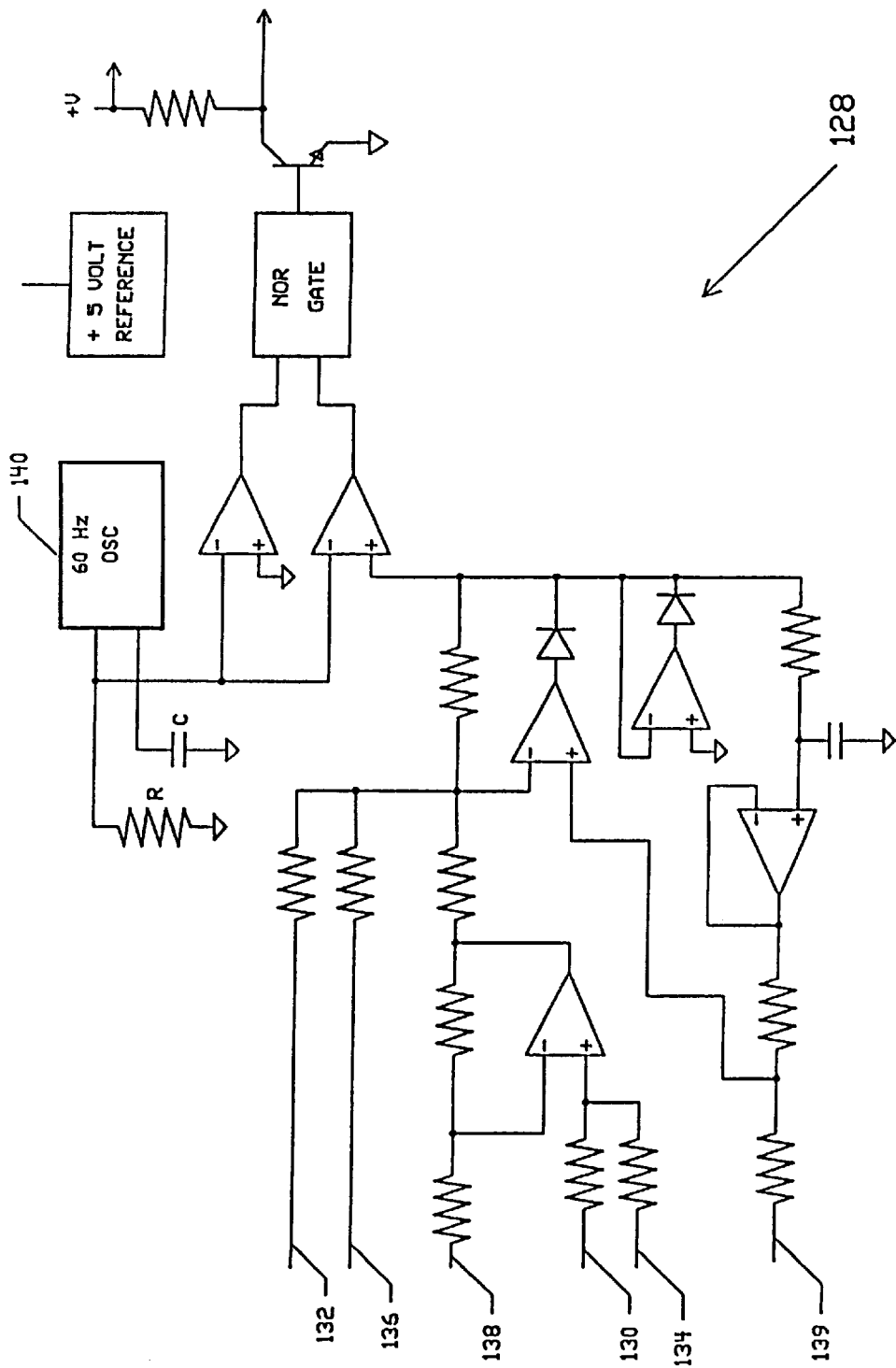
FIG. 6 depicts a pulse width modulator circuit which may be used in this invention.

The pulse width modulator circuit 128 as shown in FIG. 6 receives six voltage inputs. Four amplifier outputs 130, 132, 134, and 136 each monitor the temperatures in a respective chamber 20, 28, 38 and 40. The voltage output is derived from the respective thermistor 30, 42, 49 and 54. One voltage input is a control set point voltage 139 (manually or automatically set). The final set point voltage input 138 is an inlet thermistor 18 temperature compensation control reference set point.

The modulator circuit 128 has an oscillator 140 typically running at 128 Hz. The oscillator 140 is specifically asynchronous to the power line frequency. The modulator circuit 128 generates a positive voltage square wave output (typically at 128 Hz) having a nominal duty cycle control range of from 2 to 98%. The general function and operation of the circuit is provided by the above description and a review of FIG. 6.

In the flow condition, the positive input voltage of OPAMP A2 (operational amplifier A2) as shown in FIG. 6 is higher than the negative voltage input, causing the output voltage of OPAMP A2 to slowly increase, and the pulse width output duty cycle increases. These conditions then cause the triacs 164 as shown in FIG. 10 to fire in the typical power sharing firing order. The increasing voltage at the output of OPAMP A2 is integrated by resistor R11 and capacitor C1, and then buffered by voltage follower OPAMP A3. The time constant of R11 and C1 is typically 30 seconds. This integrator circuitry dampens sudden changes from occurring at the output of OPAMP A2. The positive output voltage of OPAMP A2 will continue to increase (within the limits of the heating means), until the proper power level is achieved to produce the operational set point temperature at the existing flow rate.

As the water heats tip, the output voltage of the thermistor amplifiers increases (the thermistor amplifier circuit 60 is shown in FIG. 2). As the differential input voltage to OPAMP A2 decreases because of the increase in output voltages of the thermistor amplifiers, the power to the heaters is reduced. This control method will result in a smooth incremental transition of power until the proper heater power to each heater element is achieved, while also maintaining the output temperature at the set point with power sharing of the heater elements. This smooth incremented transition will occur for any flow rate within the power limitations of the water heater.

Now assume that the flow of water ceases and the fluid temperature rises. The water heater begins to incrementally reduce the power to each of the elements because of the decrease of differential input voltage to OPAMP A2. OPAMP A2 will eventually reduce the duty cycle of the pulse width modulator to the point where no more power is applied to the elements. However, the latent heat of the heating elements carry the water temperature above the predetermined shutdown temperature, therefore the output of the shutdown circuit 100 as shown in FIG. 4 goes to the low state disabling the heater driver for chamber 28. It should be understood that with element 34 disabled, all other heating elements are also disabled. Shutdown will also disable all of the control relays.

Almost immediately following shutdown, the top of chamber 28 will become hotter than the bottom of chamber 28. When this no flow condition occurs, the modulation detector output 149 as shown in FIG. 7 goes to the high state, all of the control relays are de-energized, and the shift register is disabled. The control system thus goes into the standby mode. From this time on, in the preferred embodiment, heat will only be applied to chamber 28 by heater relays 113 as shown in FIG. 12 in accordance with the standby circuit as shown in FIG. 5, maintaining a minimum standby set point temperature to avoid freezing. A very small amount of power is required to maintain the standby set point temperature and temperature difference for the continuance of the standby mode.

Figure 9:
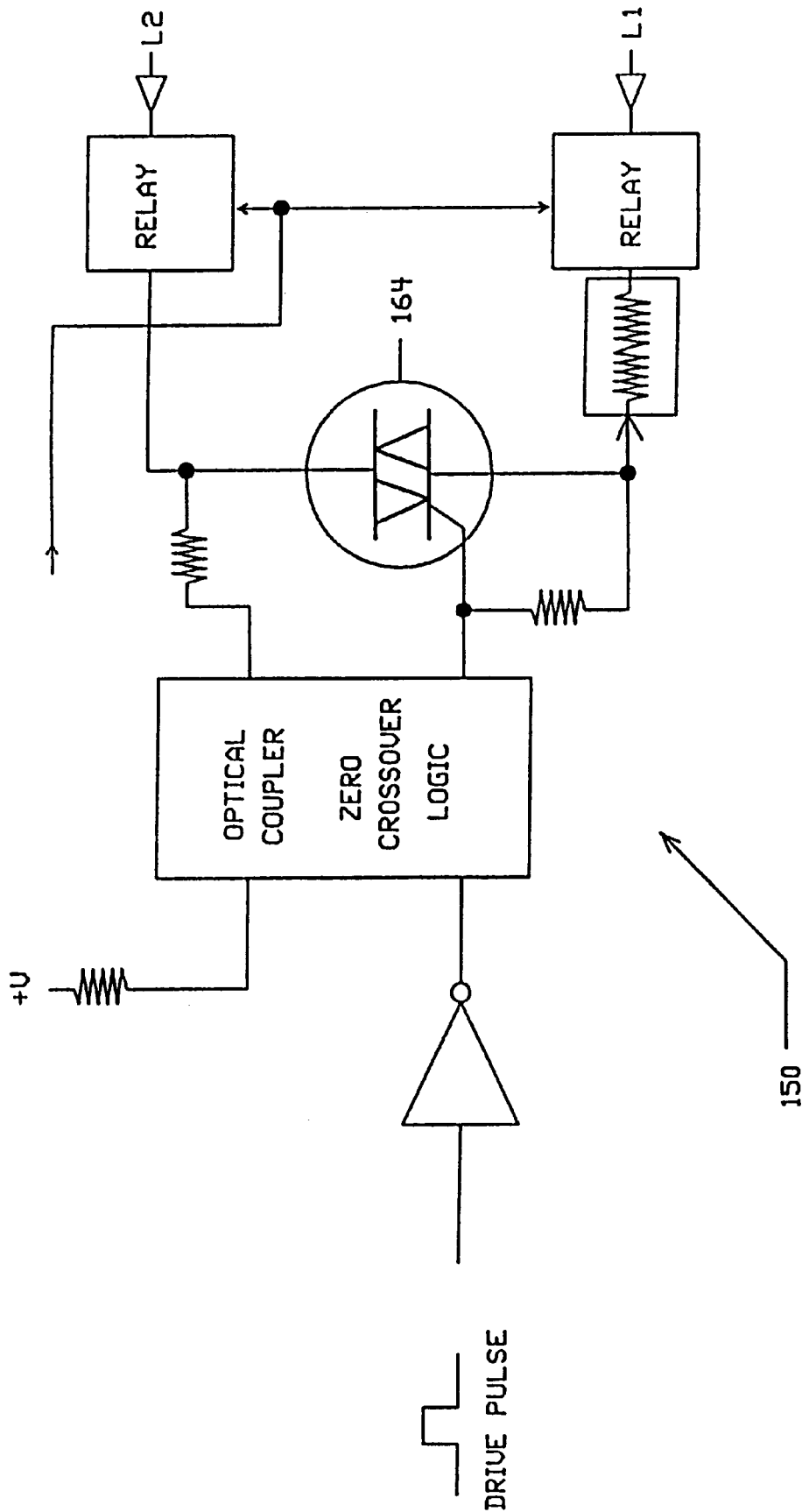
FIG. 9 depicts an exemplary optionally coupled heater driver.

When the temperatures in the chambers are much lower than the set point, the positive portion of the square wave cycle generated is of a long (time) duration. The width of this pulse, i.e., the duty cycle, determines the percentage of power or wattage output applied to the heaters. If the positive portion of the pulse (the drive pulse) is high for a long percentage of cycle time, the output power is high and the wattage output is thus high. If the positive portion of the pulse is a short percentage of the cycle time, the output power is low and the wattage output is low. The coincidence of the drive pulse as shown in FIG. 10 and the zero crossing window of the optical coupler as shown in FIG. 9 allow heater 34 to fire. The zero crossing window of the optical coupler is the range of line voltage near zero volts that the optical coupler may be enabled, typically from 0 to 5 volts.

The pulse width modulator circuit 128 in conjunction with thermistor amplifier inputs the average percentage of power which is to be applied to each of the heating elements in order to keep the outlet temperature at the control set point temperature. Computing the average percentage of power and rate of power changes, required for good temperature control greatly reduces large varying demands from the power sources. Large varying demands from the power source will cause large line voltage fluctuations. Thus this control scheme, and especially the alternate preferred embodiment to be discussed later, reduce or eliminate line voltage fluctuations which could disturb lighting, transformers and other appliances connected to the power line.

The pulse width modulator circuit 128 contains signal conditioning operational amplifiers that produce an output analog voltage that varies typically from 0 to +5 volts. This is the voltage that controls the pulse width modulator duty cycle. When the analog voltage is high, there is a demand to apply power to the heaters. When the analog voltage drops below 0.7 volts (no heater demand), a voltage level detector develops a positive output voltage that de-energizes all control relays, removing all power from the heating elements. This voltage level detector output is also referred to herein as the modulation detector. With the control relays de-energized, all heating elements are electrically disconnected or isolated from the power line or source, which is the normal condition for the heater 10 when there is no water flow. The switching triacs are thus protected from power line transients that may possibly damage these switching devices. Due to the minimal amount of time per day that this type of water heater is in operation, it can be assumed that the triacs are protected 85% of a 24-hour day.

FIG. 7 depicts suitable modulation detector circuitry 142 for power sharing of the heating elements. Voltage 146 is a positive reference voltage. When the voltage 144 proportional to the output from the pulse width modulator is coincident with the zero crossing of the power line, one-half cycle of line power is applied to heater 34. The firing of triac No. 2 develops a logic pulse which is input to a 4-stage shift register as shown in FIG. 13 that is being clocked at 120 Hz, synchronized to the supply line. The next clock pulse causes the first shift stage of the register to develop a high level output voltage at the exact zero crossing of the power line, firing triac No. 1 and putting one-half cycle of line power on heater element 22. The next clock pulse shifts the high level output voltage from register output No. 1 to the input of register No. 2. This occurs at the zero crossing of the line, firing triac No. 3, putting one half cycle of line power on heater 44. The next clock pulse shifts the high output voltage from shift register output No. 2 to the input of register No. 3. This occurs at the zero crossing of the line, firing triac No. 4, putting one-half cycle of line power on heater 50. A suitable shift register control 108 is depicted in FIG. 13.

The pulse width modulator circuit 128 initiated the firing of heater 34 for one half cycle. The firing of heater 34 developed a logic pulse that was clocked into register, firing heater 22 at zero crossing for the next half cycle. The next clock pulse again shifted output voltage, firing triac No. 3 at zero crossing to supply power to heater 44 for the next half cycle. The next clock pulse shifted the logic pulse which powered heater 50 for the next half cycle. The important features of this power line control method are that the same amount of on-time is delivered to each heater element and the line power is always used in full cycles. Maintaining full cycle usage of the power line assures that problems caused by half cycling, including problems in transformers with direct current biasing, do not occur.

Figure 8:
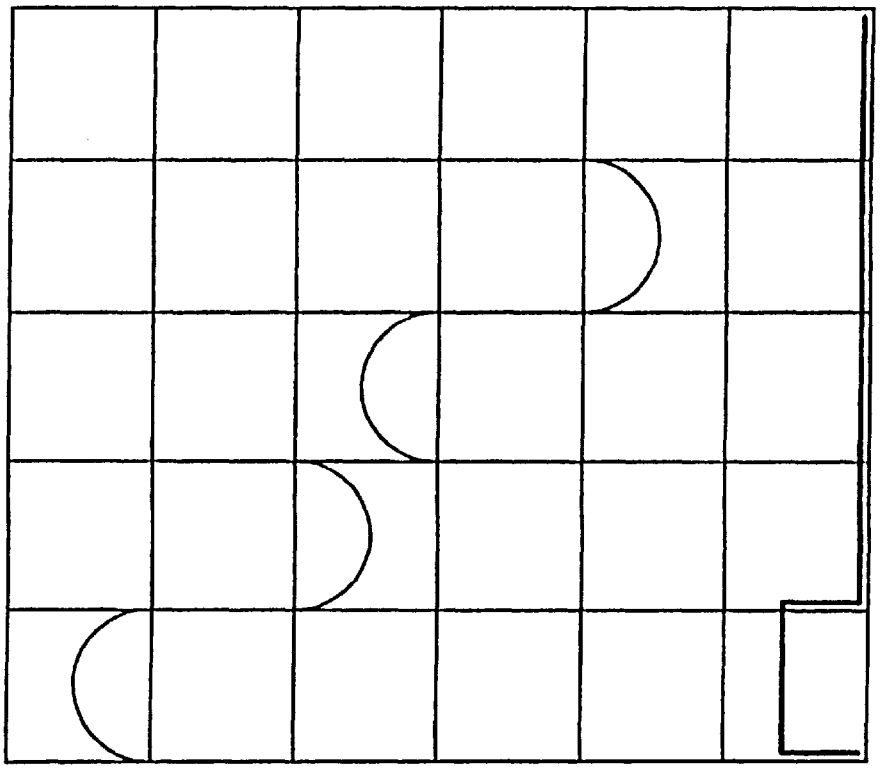
FIG. 8 illustrates a typical firing order for different times according to this invention.

The firing of heater 34 causes heaters 22, 44 and 50 to fire in modulated half cycle sequence through the two full electrical cycles shown in FIG. 8. Assuming that all four elements are the same wattage, the total current drain from main power source to the heaters is equivalent to only one heater element being used at full power, thereby obtaining equal power sharing. It may be understood that if the sense circuit 102 in FIG. 10 senses firing on every half cycle of the power line, the pulses will be clocked through the shift register and provide full and continuous power to all heater elements. Triacs fired in order and at the zero crossing of the power line greatly reduce radio interference.

The optically coupled heater driver circuitry 150 as shown in FIG. 9 for heaters 22, 44 and 50 are identical in design. The outputs from the individual shift register are input to a transistor inverter which in turn drives the light emitting diode of an optical coupler. The commmand data is optically coupled via a standard coupling arrangement to the input of the triac switch. The optical couplers are of the type that turn the triac on at the zero crossing of the power line. Heater driver circuitry for heater 34 is similar to the drivers 150, except that when fired, the driver for heater 34 initiates an additional sense element as shown in FIG. 10 that develops a positive logic level to the shift register as shown in FIG. 13, enabling the power sharing control mechanism. As discussed above, any one of the heaters could be used with the FIG. 10 driver circuitry to serve the control function as employed in the heater driver circuitry for heater 34 as disclosed above. The optical couplers are available with reasonable breakdown voltages and are reliable in this application.

FIG. 12 discloses an alternative magnetically coupled heater relay circuit 170 that protects against line transients and unsafe operating conditions. Heater relays 1, 2, 3 and 4 are associated with the heating elements 22, 34, 44 and 50, respectively, as shown in FIG. 1. The operation of the circuit 170 should be apparent from the above description and a review of FIG. 12.

Figure 11:
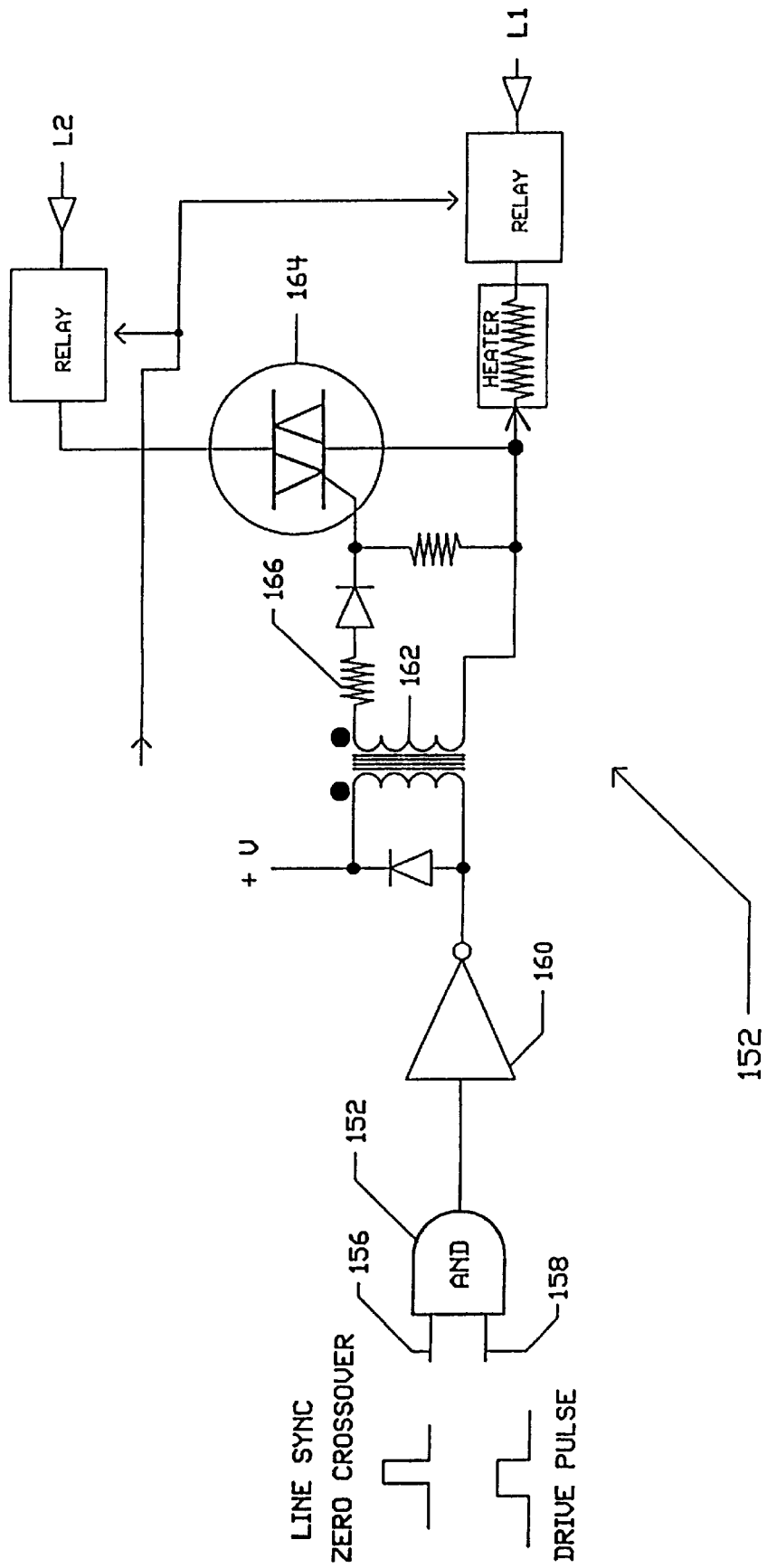
FIG. 11 depicts a magnetically coupled heater driver.

Circuit 152 is another embodiment as shown in FIG. 11 utilizing an AND gate 154 that has one input 156 connected to a logic signal that occurs at the zero crossing of the power line and a second input 158 from (the shift register. The output of the AND gate 154 drives a solid-state switch 160 which drives the primary of a pulse transformer 162. The step-down secondary drives the input of the triac 164 through a current limiting resistor 166.

When the water heater is operating at full power, the current from the power line can be quite high. Input circuit breakers and line feed wire size should be large enough to accommodate this current. In this embodiment, multiple circuit breakers and line feeds are incorporated for a realistic installation hardware.

Assume that the hot water heater is in the standby mode (refer to standby circuit 106 as shown in FIG. 5. Since all of the control relays de-energized, the top of chamber 28 is therefore hotter than the bottom of chamber 28. The output from the modulation detector as shown in FIG. 7 is in the zero state. A demand on the hot water heater is initiated by flowing water cooler than the operational set point temperature through the system. When the temperature sensed by thermistor 30 approximates the temperature sensed by thermistor 42, the output of the standby circuit goes to the zero state, taking the hot water heater out of the standby mode. The shutdown circuit 100 as shown in FIG. 4 will be in the high state at this time, assuming that the inlet water is cooler than the predetermined shutdown temperature, and the circuitry will thus indicate a flow condition. (If the inlet water temperature is above the set point temperature, no heat will be applied to the water.) When flow detection occurs, the modulation detector output drops to the zero state, all of the control relays are energized, and the shift register is enabled. The water level detectors can utilize either DC or AC voltage, as is desirable for the application. The water level detectors prevent any overheating damage from occurring to the heat exchanger when trying to operate the heater without water in the chambers.

Figure 15:
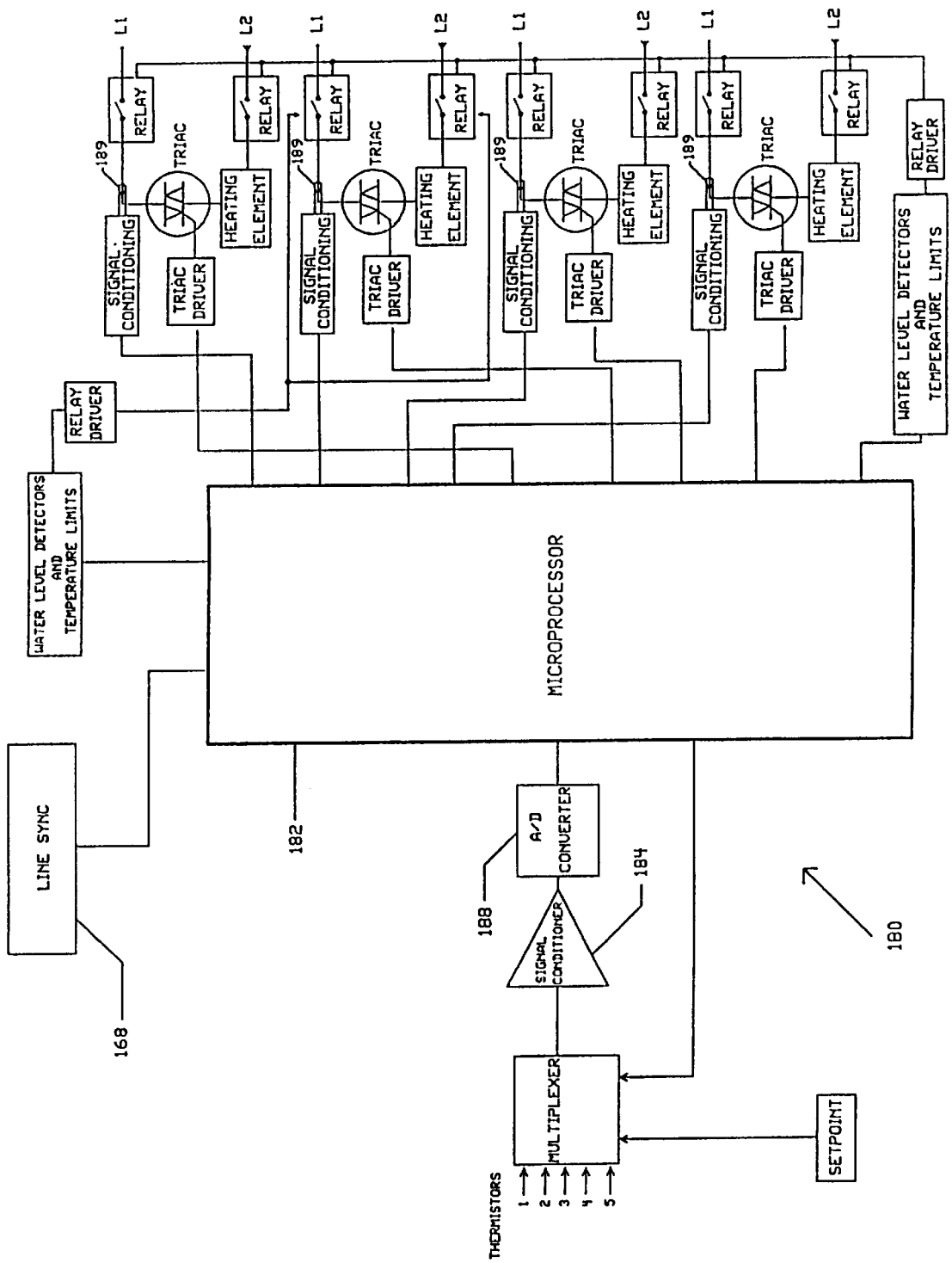
FIG. 15 depicts circuitry using a microcontroller according to this invention.

FIG. 15 discloses one embodiment that includes circuitry 180 utilizing a microcontroller or MCU 182 or other microprocessing system. Under microprocessor control, the output signals from the thermistors are scanned into a signal conditioner 184 similar to the temperature amplifier in FIG. 2. The set point signal is also scanned into the signal conditioner. The set point signal can be established by a potentiometer, a keypad and display, or a remote analog or digital input device. From the signal conditioner 184, the signal is sent to an A/D (analog-to-digital) converter 188.

Figure 14:
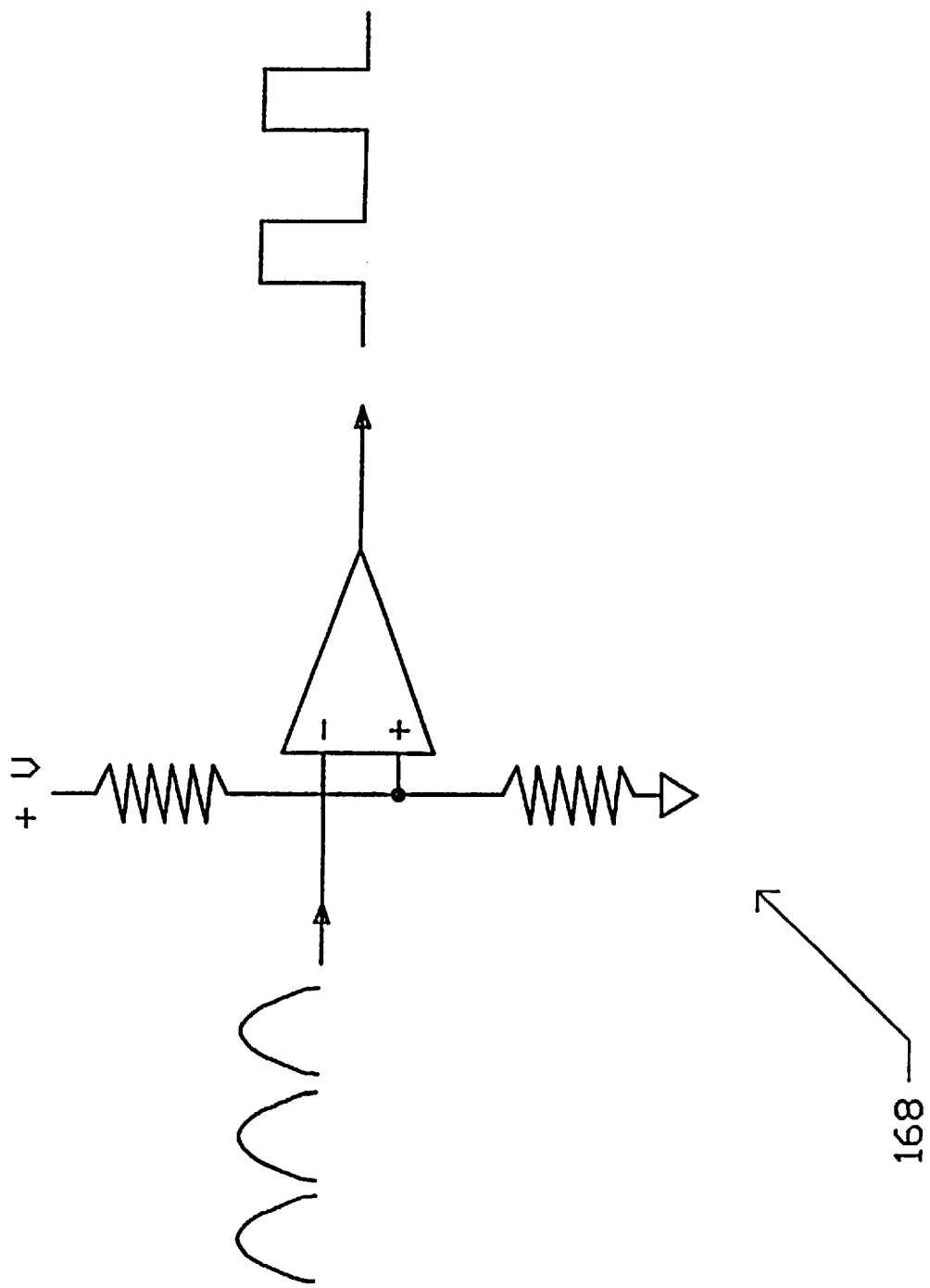
FIG. 14 depicts a line sync amplifier.

The A/D 188 is a common circuit and may be included integrally in the microcontroller. The MCU can be any one of many common microcontrollers or microprocessing systems. The line sync circuitry 168 as shown in FIG. 14 may be a clock signal for the MCU derived from the line frequency in order to provide line synchronization. The line synchronization would simplify line power control algorithms. Alternately a separate MCU clock and line sync input to the MCU may be used. In the preferred embodiment, the shutdown circuit as shown FIG. 4 and standby circuit as shown FIG. 5 are included in the software of the MCU. No pulse width modulator is needed in this embodiment. The circuitry as shown in FIGS. 9 or 11 may be used for the triac driver and switching means, since a triac is one form of a switch. The embodiment as shown in FIG. 15 also utilizes water level detectors and high temperature limit switches (see FIG. 1) for product safety.

In the embodiment shown in FIG. 15, current transformers 189 as shown in FIG. 15 or other current sensors together with voltage sensors are incorporated as additional inputs to the MCU. These inputs are utilized by the control algorithms to enhance the precision of the temperature set point control. No additional disclosure or circuitry is shown since one skilled in the art, given the disclosure of the preferred embodiment and the FIG. 15 embodiment, may easily develop the necessary software for the MCU in order to use current transformers to obtain and utilize the status information on the heating elements. This software may allow for compensation of bad elements, element wattage imbalance, leakage current, as well as other abnormal conditions and may also provide control assistance based on the temperature rise per watts input for a given chamber. One skilled in the art may thus develop the necessary circuitry and algorithms to accomplish these objectives or enhancements to develop the technology disclosed herein.

Figure 16:
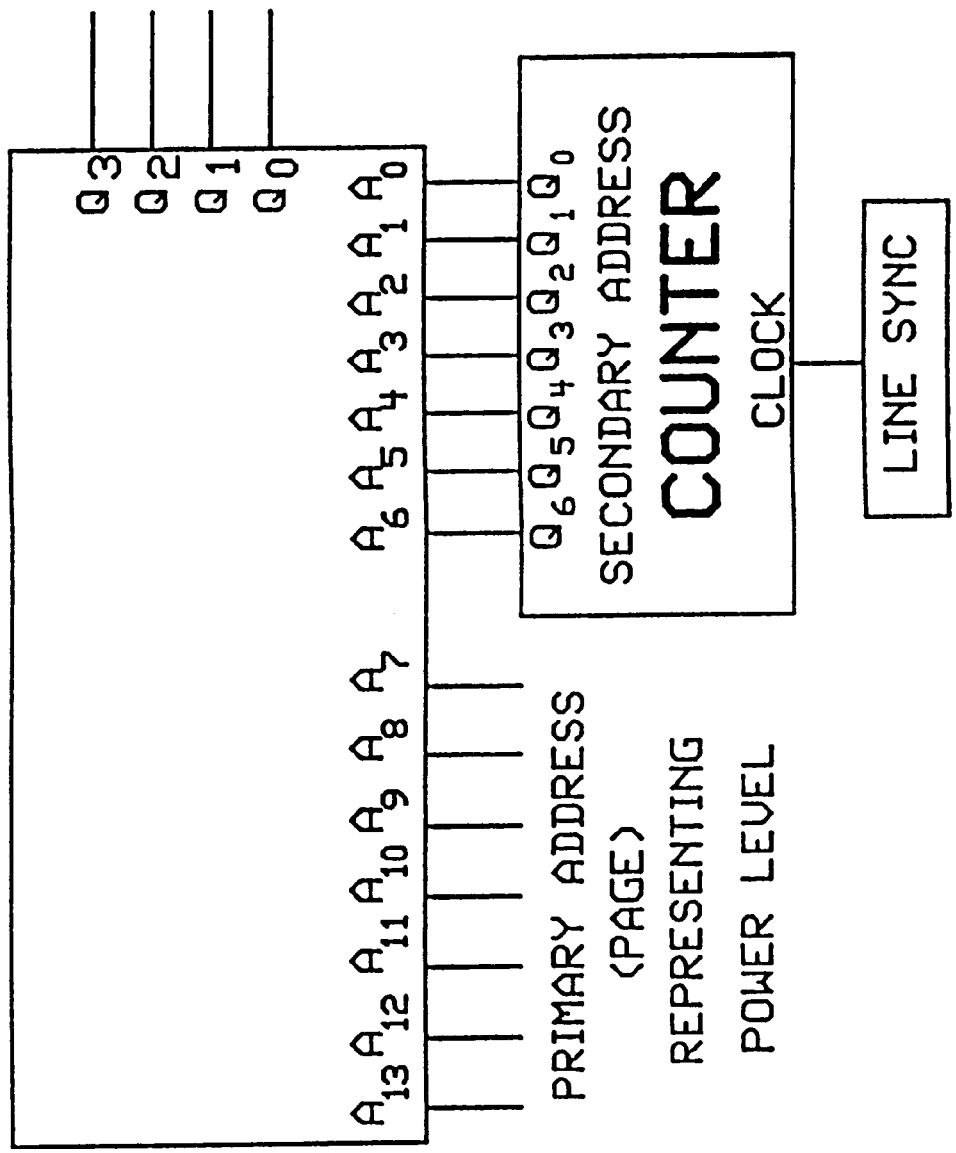
FIG. 16 depicts a power control circuit that may be used in the circuitry as shown in FIG. 15.

To maintain as little influence on the incoming power lines as possible and also maintain extended element life, a power control that maintains full cycle utilization and power fluctuations that are faster than the persistence of vision are essential. A preferred method of line power control may use a Read Only Memory (ROM) as part of the power control circuit 192 shown in FIG. 16. The power control circuitry as shown in FIG. 16 thus may replace the pulse width modulator circuitry shown in FIG. 6. In the preferred embodiment, the ROM is contained in the microprocessor, although an external ROM may be used. In the ROM is stored the bit stream for the half cycle utilization of each heater. Each bit stream takes into account full cycle utilization and keeps the odd half cycles in certain power level bit streams to a repetition rate that is faster than the persistence of vision (the flicker caused by varying power load is unnoticeable). The ROM address is divided into two parts, the primary and secondary addresses. The primary address locates in memory the starting address of a bit stream for a particular power level. The secondary address is connected to a counter that clocks the stored bit stream to the outputs for power control. In the preferred embodiment, 128 primary addresses may be used to provide better than 1% control power steps, and a seven bit secondary address was used to clock through a 128 bit-bit stream.

There is a tremendous amount of heating capacity versus the small volume of water in the heat exchanger chambers. Because of frequent flow rate changes, it is highly desirable to have anticipation circuitry or anticipation algorithms to properly implemented the desired control scheme. In the preferred embodiment, the method for implementing anticipation is to measure the rate of temperature change per unit time.

When the proper amount of power is being applied to the heaters for a given constant flow rate, the output temperature will remain constant at the set point temperature. But, when the flow rate is suddenly increased or decreased, the temperature as sensed by the thermistors are in error. This error is due to thermal response time lag of the thermistor and thermal conduction of the water.

Figure 17:
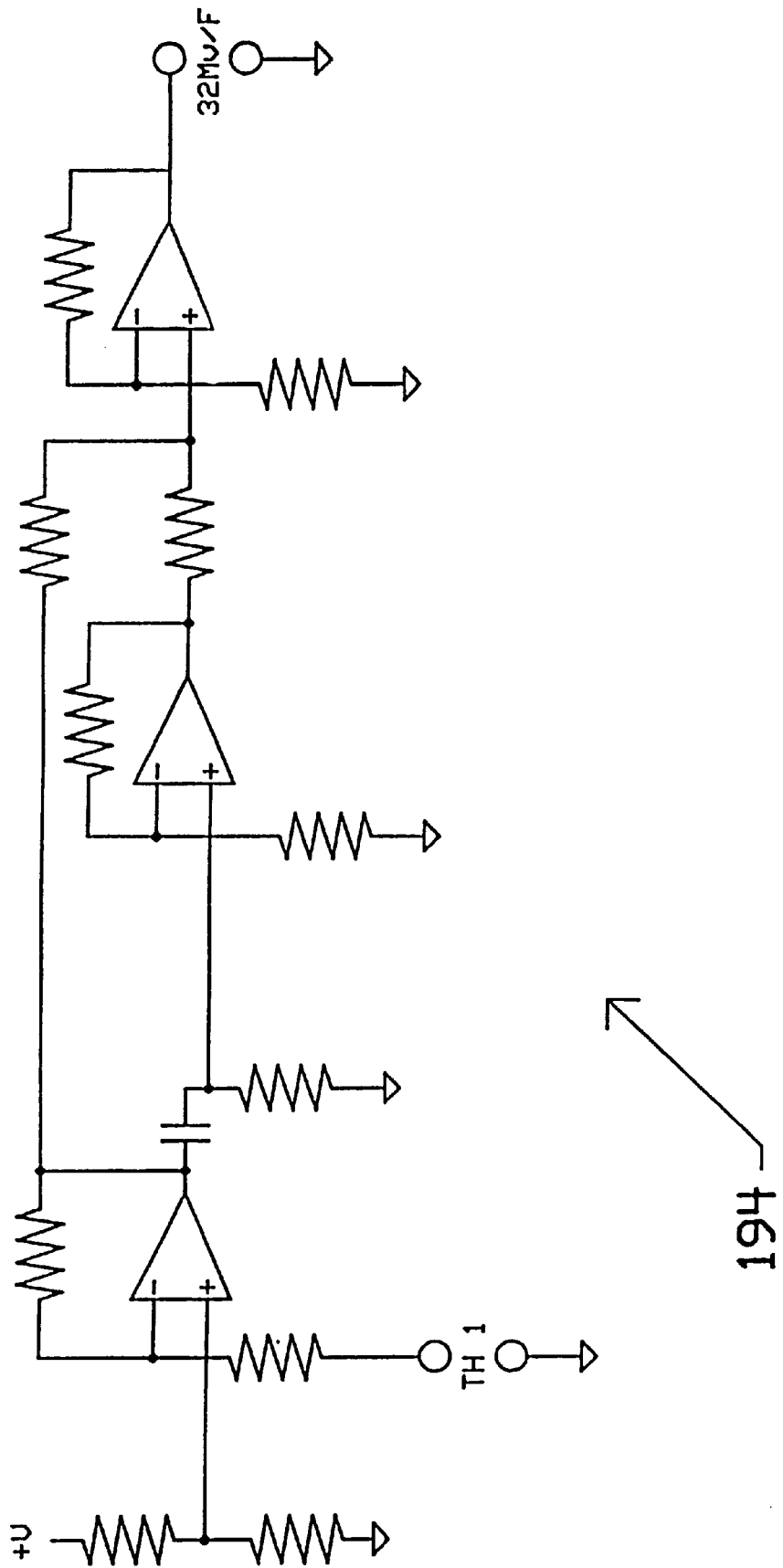
FIG. 17 depicts a suitable compensation circuit to correct for the delay of current temperature information.

The circuitry 194 in FIG. 17 is an improvement to the thermistor amplifier circuit 60 as shown in FIG. 2, and compensates for the delay of correct temperature information. The time constant of R1 and C1 can be adjusted to provide either a time corrected temperature, for correct instantaneous temperature information, or to exaggerate the changing temperature to provide anticipation. The output voltage of this circuitry would provide anticipation information. This circuitry would be emulated by an algorithm in the embodiment as shown in FIG. 15, which uses an MCU control scheme.

Figure 18:
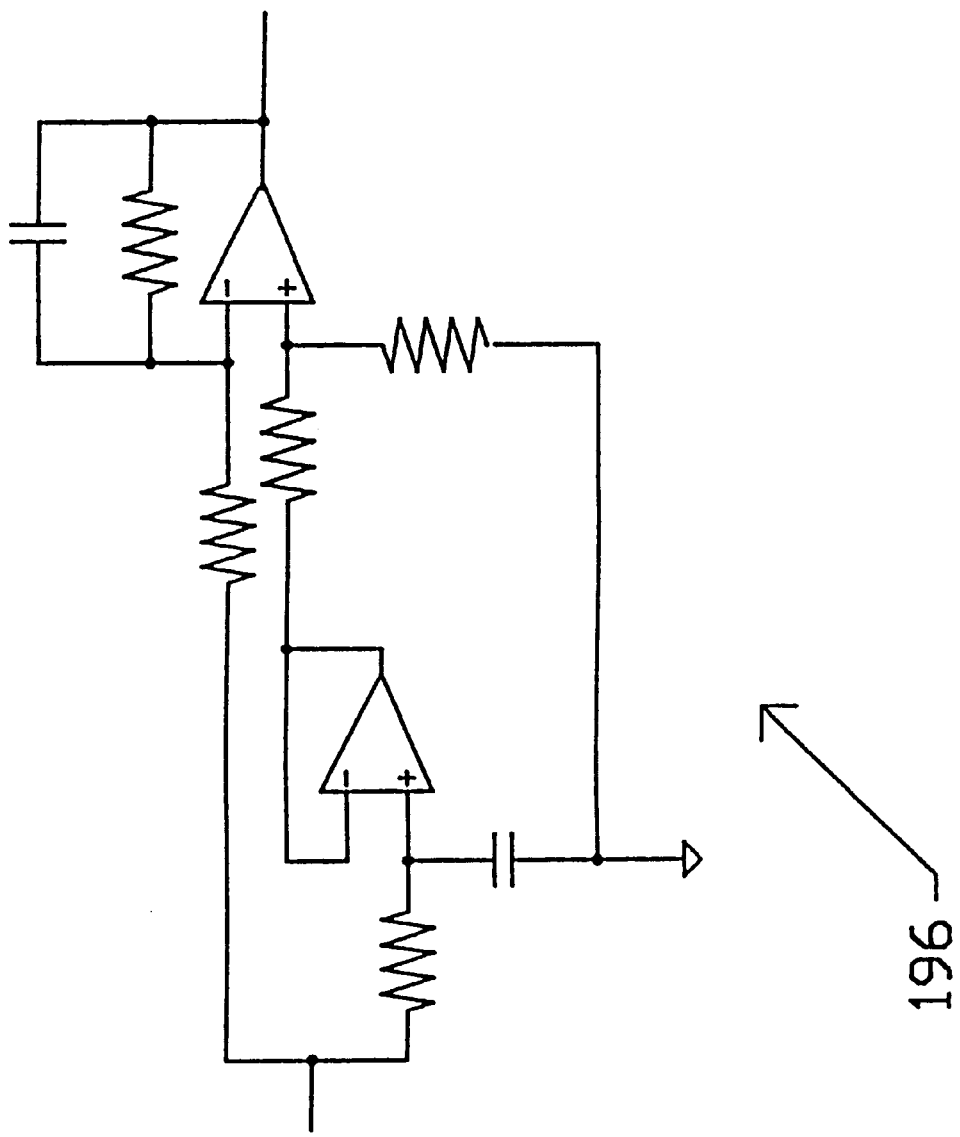
FIG. 18 depicts a suitable anticipation circuit for anticipating the rate of temperature change as a function of time.

FIG. 18 discloses a circuitry 196 for providing information on the rate of temperature change per unit time. The output voltage of this circuitry would provide anticipation information. This circuitry may also be emulated by an algorithm in the embodiment as shown in FIG. 15.

Figure 19:
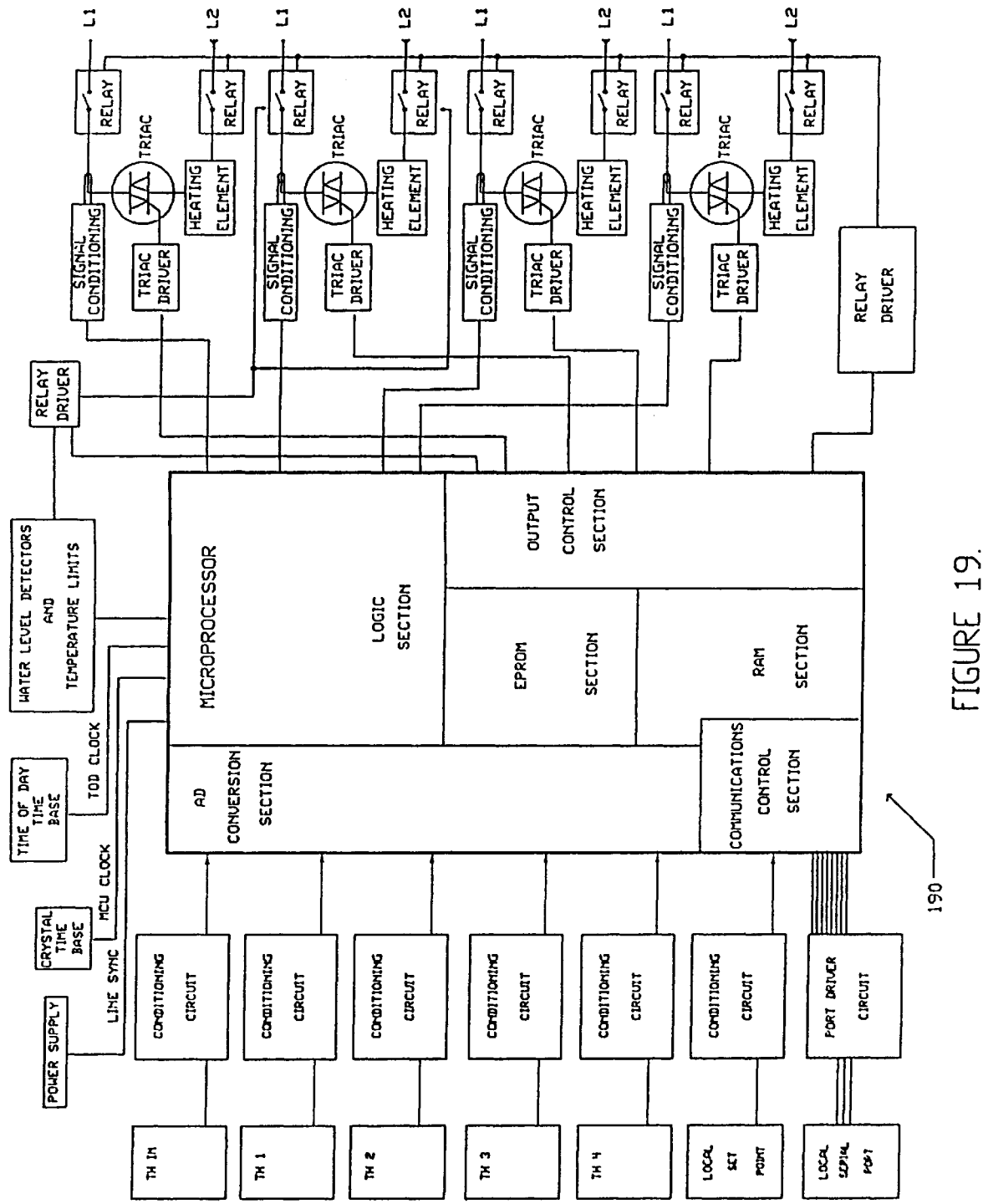
FIG. 19 depicts an alternative microprocessor block diagram according to this invention.

An alternate microprocessor based circuit 190 is shown in FIG. 19. The circuitry as shown in FIG. 19 is thus an alternative to the circuitry shown in FIG. 15.

The five thermistors TH 1N, TH 1, TH 2, TH 3 and TH 4 corresponding to thermistors 18, 30, 42, 49 and 54, respectively, as shown in FIG. 1 are arranged so that each heating chamber may be monitored in turn for its temperature and the relationship of that temperature above or below a set point temperature. This series of relationships are then used to develop the equation that best suits the need for power to the heating elements to bring the temperature of the water flow to the set point temperature at the output of the system. These relationships are also used to monitor the flow of water.

By calculating the effect of a particular power level applied to the heating elements over a period of time, the rate of change in water temperature may be determined. This rate of change may then be compared to the difference between the water temperature at the output of the system or chamber and a set point to determine how much additional time at a given power level is needed to raise the water temperature to the required set point. If the rate of change is not satisfactory, additional power may be applied to each of the heating elements in the power sharing fashion described previously. If the output temperature is approaching the set point, the power level may be lessened to preclude overshoot of the set point temperature. By reducing the power level before the set point temperature is reached, the latent heat stored in the heating elements may be used to eliminate heating the water to a point above the set point temperature and then dropping below the set point. This anticipation of the demand for power to heat the water to a particular set point without overheating and without allowing the water temperature to rise above and fall below the set point is a particular feature of this invention. An embodiment utilizes algorithms to correct the temperature input signals to present time.

The heating elements are connected to the power line via triacs. The primary causes of failure for these triacs are power line fluctuations and spikes on the AC power line. Since the system will be in the off condition for most of the time, as previously described, a method for disconnecting the triacs from the AC power line is desirable. The relay circuitry provides this protection for the triacs by opening the AC power line to the triacs when there is no demand for heat in the system. Since the system is typically in the off condition for approximately 85% of the time, the reliability of the triacs will be dramatically improved with this relay isolation.

The power applied to the heating elements is limited to only that which is needed to bring the water temperature to the set point temperature, although this is not the only consideration required for effective operation. If power were to be applied suddenly to the heating elements simultaneously, the demand would cause undesirable effects on the power line, such as a flicker in lights operational at the time on demand, or a reduction in voltage available to power sensitive appliances such as air conditioners and refrigerators. To avoid this annoying flicker of lighting and to limit the reduction in available voltage, the technique of this invention shares the load across the heating elements so that not all the demand for power is answered at once, and so that the system will not shutdown abruptly when the demand is lessened.

The present invention thus provides for proportional power control, based on demand, to be shared by each heating element. In one operational mode, this power is applied in alternate half cycle pulses so that each element is heating at about one-fourth of the total power level. Upon reduction in demand and in shutdown, the elements are again incrementally de-energized in the reverse manner. The power delivered is shared by each heating element at all times, and in one embodiment may be equally shared. The intrinsic design requirements of the heater, require models whose heating elements have sufficient wattage capacity to provide hot water for the contemplated applications. Since most heating applications will require less than 100% of the intended maximum power output, each element is equally energized in operation less than 100% of its rated wattage output. Unlike the sequential activation schemes of the prior art, which activate one heating element and continuously maintain that element activated while activating other heating elements, in the disclosed embodiments heat is evenly distributed throughout the heat exchanger 10, thereby avoiding hot spots at shutdown and significantly reducing high temperature overshoot of the water with sudden reductions of flow and at shutdown. Furthermore, the power sharing technique insures that heat is at all times evenly distributed throughout the system during operations. The micro-temperature effects of power changes to the heating means are more effectively, evenly and rapidly monitored for precise temperature control. The algorithms needed for this operation may be contained in the software of the microprocessor.

A preferred embodiment of this invention uses four 7,000 watt heating elements connected electronically in parallel and arranged in series with respect to fluid flow through the water heater, as shown in FIG. 1.

According to this invention, heating demand from the system over a practical time period of, for example, 1 second is continuously divided between each of the heating elements. Heating elements are preferably energized in a time spaced, overlapping activation, as shown in FIG. 8. The incremental loading of the heating system is increased at ½ cycle of energy to each heating element added. All heating elements thus are energized in an overlapping fashion until the total power requirement as a function of the demand is divided between each of the heating elements to provide the necessary power to reach the set point temperature. In most applications, each of the elements will thus be operating during a practical time period of 1 second at less than 100% power. As power is reduced in the same but reverse fashion, the heat is distributed more evenly over the total available elements so that at shutdown the hot spots in localized areas are eliminated or at least significantly reduced.

The heating means may be activated in alternate half cycle activation as disclosed above so that the time spacing in initial activation is one half cycle or 8.33 milliseconds for a 60 cycle per second power supply. As explained further subsequently, time spacing of activation to provide reasonable temperature control may be as long as 32 half cycles (approximately ¼ second) between the activation of successive elements, but preferably is 8 half cycles or less. The significance of this time spaced activation is that the demand during a time of, for example, 1 second or more is divided between all the available heating elements. This 1 second time period is significantly shorter than the system time constant required to indicate full temperature change. The enhanced anticipation circuitry as shown in FIG. 18 and thermistor time correction circuitry as shown in FIG. 17 significantly enhance this type of control.

The control scheme according to this invention for activating the heaters establishes a very short and predetermined duration for supplying power to the first activated heating element. As discussed above, the period may be as short as one half cycle of power. Power during the one half cycle period may be distributed to more than one heater, and no significant benefit would be realized by splitting power during a half cycle to multiple heaters. Although the period of one half cycle has been discussed in detail previously, this predetermined period of activation for the first heater may be 2, 4, or 8 half cycles. The predetermined period for initially activating the first heater is, however, preferably less than 32 half cycles, which approximates ¼ second for a 60 cps power supply. As disclosed above, the activation of the first heating element results in an equal activation period for each of the other heating elements in the system. If the period of activating the first heating element was longer than 32 half cycles, and if the other heating elements were similarly activated for a period in excess of 32 half cycles, the benefits of the invention relating to accurately and smoothly controlling the temperature of the water passing through the heater system would be minimized.

According to the scheme as shown in FIG. 6, the predetermined period of activating the first heating element was one half cycle, and that resulted in the same predetermined period of activating each of the other heating elements. If the required heating load is very low, successive one half cycle activation of each of the four heating elements may be followed by a relatively long period of deactivation of all of the heating elements. If the load increases, the period of deactivation shortens until such time that the activation of the fourth heating element during its half cycle is immediately followed by the reactivation of the first heating element during its half cycle. At this point, the system is thus operating at one-fourth of its maximum power.

If the load thereafter increases, the first heating element may be reactivated for a second time while the fourth or the third heating element is first activated. Alternatively, the period of activating the first heating element may be increased from one half cycle to, for example, four half cycles, but the period between the activation of the first heating element in each successively activated heating element may still remain at one half cycle or two half cycles.

For any substantial interval of time greater than, for example, 1 second, it is important that each heating element is activated for the same amount of time during this interval so that load is equally distributed. Before heater 1 is activated, a predetermined period of activation is determined, and that predetermined period determines the period of activation of each of the other heaters. In the preferred embodiment, the period of activation of each of the heaters is equal, so that the load is equally distributed. Alternatively, the first heater could be activated for a predetermined period of, for example, four half cycles, which then would result in the activation of heaters 2, 3, and 4 for a predetermined period of, for example, two half cycles. In any event, the period of time for activating each heating element is relatively short and, as explained above, is preferably less than 32 half cycles, and the period of time between the activation of the first heating element and each of the successively activated heating elements is also relatively short and is preferably less than 32 half cycles. This short period of time is a function of the alternating power supply to the heating system, but in any event is a fraction of a second.

It should be understood that in some applications it may be desirable that the controller according to this invention first energizes the last heating element along the flow path of fluid through the water, e.g., the heating element 50 as shown in FIG. 1. Also, the controller may, at start-up, input continuously full power to this fourth heating element so that it is receiving every half cycle of energy. During this start-up, the third, second, and first heating elements may be initially activated starting at successive half-cycle intervals from the initial activation of the fourth heating element. The controller may regulate the power to the third, second, and first heating elements as described above, with each element sharing power delivered at half cycle increments as demand requires. For example, from start-up to a time period of 10 seconds after start-up, the fourth heating element may be fully activated every half cycle, while the third, second and first heating elements are each activated every fourth half cycle. Even during the start-up, the half cycle activation of the third heating element controls the half-cycle activation of the second and first heating elements. The advantage of this alternate technique is that, at start-up, full power is applied to the fourth heating element to result in hot water being more quickly available to the user. After the 10 second start-up period, the controller may switch to the mode described above where each heating element contributes substantially equally to the load output by the water heater. Even in this embodiment, however, during a relatively short period of time, 1 second or greater, each of the heating elements are contributing to the total power output of the water heater.

One alternate embodiment provides for the optional addition of a serial port to the system allowing two way communication to a remote site. This feature provides a mechanism for the remote site to call for a reduced or elevated set point temperature based on need, such as hotter water for dishwashing or cooler water for showering. One skilled in the art may thus develop an operational set point at approximately 110° F. for all normal operation, which set point could be raised only when hotter water for applications such as a dishwasher may require. This feature will further reduce mineral deposit buildup as a result of normally lower heat requirements, as well as a reduction in piping losses normally associated with transmitting higher temperature water throughout the hot water supply distribution system. This feature would also allow the power company to request a reduction in power consumption during peak power periods. Operational alarms could also be transmitted to the remote site, thereby indicating the loss of a heating element or the interruption of service by a limit switch needing manual reset. The port may allow real time, average, and peak power requirements to be transmitted to the remote site.

It is previously noted that the number and position of the thermistors may be changed depending upon the application requirements. The location of the thermistors from that depicted in FIG. 1 may also be changed. For example, thermistor 18 could be located in the bottom of chamber 20, and thermistor 54 could be located within the outlet line 52. In alternate embodiments of the invention, the high temperature shutdown voltage may be determined in any chamber or combination of chambers using the same or similar location of the thermistors. It should also be understood that the standby circuitry may derive its referenced voltage deviation signals from any two thermistors wherein a first thermistor is located near the top of one heating chamber and upstream from a second thermistor located downstream of the first thermistor.

The embodiments disclosed above activated the triacs in response to the signal from the optical couplers at zero crossing. In lieu of the optical couplers, proportional phase control may be used to trigger the triacs, although proportional phase control is considered less desirable due to the effects created by radio frequency interference.

The embodiments of the water heater described above disclose the use of multiple chambers each having a respective heating element therein. Those skilled in the art should appreciate that the control scheme of this invention may be utilized to control the fluid temperature and activation of multiple heating elements located within a single chamber, or a single multi-section heating element as disclosed in U.S. Pat. No. 5,020,127 located in a single chamber. Each of the individual sections of the single multi-sectional heating element may thus be controlled in the same manner as each of the multiple heating elements disclosed herein. Those skilled in the art will also appreciate that the present invention is particularly suited for heating water for home and industrial uses. The heater may be used for heating various other fluids, however, such as oil or other hydrocarbons used in various commercial or industrial applications.

Solar water heating systems typically provide a storage tank for the heated water. After this hot water is used, the recovery period for the solar system to heat the water contained in the storage tank is relatively long. Furthermore, during a period in which solar heating is not available, the stored water must be heated. During these periods, the fluid storage function of a conventional storage tank heater is subject to all its peculiarities, including standby energy loss. The benefits of coupling the heater as disclosed herein to a solar system will thus provide an automatic, self-regulatory, energy efficient system. The simplest method for accomplishing this is to attach the outflow pipe of the solar storage tank directly to the inlet tank of the heater 10. The outlet tube of heater 10 would then be connected in the normal fashion to the hot water distribution line. As the solar heated water flows from its storage tank and into the heater 10, temperatures would be sensed in the same fashion as disclosed herein. So long as the hot water preheated by solar energy was above the heater set point, no demand would be required, and thus the water heater 10 would remain passive and add no heat. At such times as the temperature of the water flowing from the solar tank into the heater 10 fell below set point, the heater would incrementally add heat to maintain a steady and constant set point temperature.

A heat recovery system that transfers heat from the condenser coil heated by hot gases produced from the discharge side of the a/c compressor or heat pimp is becoming increasingly popular. In this system, the condenser coil of the a/c unit or heat pump is immersed in a water storage tank. As the hot gases heat the coil, the heat is transferred to the adjacent water contained in a storage tank. As with the solar powered system described above, the ability to provide hot water may be

What is claimed:

1. A heater powered by an alternating current source for substantially instantaneous heating of a fluid, the heater comprising:

a housing defining a chamber therein and having an inlet aperture and an outlet aperture;

a plurality of electrically powered heating elements each within the chamber for heating fluid;

one or more temperature sensors each in fluid communication with the heated fluid; and a controller for selectively activating each of the plurality of heating elements at a first zero crossing of alternating current and deactivating the activated heating element at a second zero crossing of alternating current in response to the one or more temperature sensors, the controller activating a first of a plurality of heating elements for a predetermined first period of time equal to or greater than 1 half cycle and no greater than 32 half cycles of the alternating current source and activating a second of a plurality of heating elements for a predetermined second period of time equal to or greater than the 1 half cycle and no greater than 32 half cycles of the alternating current source, such that each of the first and second heating elements contributes to the heating of the fluid passing through the heater.

2. The heater as defined in claim 1, wherein the controller initiates activation of the second of the plurality of heating elements after a predetermined period of time of no more than 8 half cycles after the activation of the first of the plurality of heating elements.

3. The heater as defined in claim 1, wherein the controller initiates activation of the second of the plurality of heating elements after a period of time of no more than 32 half cycles of the alternating current source after the activation of the first of the plurality of heating elements.

4. The heater as defined in claim 1, wherein the duration of the first period of time is substantially equal to the duration of the second period of time.

5. The heater as defined in claim 1, further comprising:

a clock for initiating activation of at least one of the plurality of heating elements.

6. The heater as defined in claim 1, wherein the controller activates each of the plurality of heating elements for substantially the same period of time during a time interval of at least 1 second.

7. The heater as defined in claim 1, wherein:

the housing defines a plurality of chambers therein each fluidly connected between the inlet aperture and the outlet aperture; and each of the plurality of heating elements is positioned within a selected one of the plurality of chambers.

8. The heater as defined in claim 1, wherein the housing is plastic.

9. The heater as defined in claim 1, further comprising:

a fluid level detector for detecting fluid level in the chamber.

10. A heater powered by an alternating current source for substantially instantaneous heating of a fluid, the heater comprising:

a housing defining at least one chamber therein having an inlet aperture and an outlet aperture;

a plurality of electrically powered heating elements each within one of the at least one chamber for heating the fluid;

one or more temperature sensors each in fluid communication with the heated fluid; and a controller for selectively activating each of the plurality of heating elements at a first zero crossing of alternating current and deactivating the activated heating element at a second zero crossing of alternating current in response to the one or more temperature sensors, the controller activating a first of a plurality of heating elements for a predetermined first period of time and activating a second of a plurality of heating elements for a predetermined second period of time, the controller initiating activation of the second heating element within no more than 32 half cycles of the alternating current source after initiating activation of the first heating element, such that each of the first and second heating elements contributes to the heating of the fluid passing through the heater.

11. The heater as defined in claim 10, wherein the controller activates each of the first and second heating elements for a respective first and second period of time no greater than 32 half cycles of the alternating current source.

12. The heater as defined in claim 10, wherein the controller initiates activation of the second heating element after a predetermined period of time of no more than 8 half cycles after initiating activation of the first heating element.

13. The heater as defined in claim 10, wherein the duration of the first period of time is substantially equal to the duration of the second period of time.

14. The heater as defined in claim 10, wherein the controller activates each of the plurality of heating elements for substantially the same period of time during a time interval of at least 1 second.

15. The heater as defined in claim 10, wherein:

the housing defines a plurality of chambers therein each fluidly connected between the inlet aperture and the outlet aperture; and each of the plurality of heating elements is positioned within a selected one of the plurality of chambers.

16. A heater powered by an alternating current source for substantially instantaneous heating of a fluid, the heater comprising:

a housing defining a plurality of chambers therein and having an inlet aperture and an outlet aperture;

a plurality of electrically powered heating elements each within a respective one of the plurality of compartments for heating the fluid;

one or more temperature sensors each in fluid communication with the heated fluid; and a controller for selectively activating each of the plurality of heating elements at a first zero crossing of alternating current and deactivating the activated heating element at a second zero crossing of alternating current in response to the one or more temperature sensors, the controller activating a first of a plurality of heating elements for a predetermined first period of time equal to or greater than 1 half cycle and no greater than 32 half cycles of the alternating current source and activating a second of a plurality of heating elements for a predetermined second period of time equal to or greater than 1 half cycle and no greater than 32 half cycles of the alternating current source, the controller initiating activation of the second heating element within no more than 8 half cycles after the initiating activation of the first heating element, such that each of the first and second heating elements contributes substantially equally to the heating of the fluid passing through the heater.

17. The heater as defined in claim 10, wherein the controller activates each of the plurality of heating elements for substantially the same period of time during a time interval of at least 1 second.

* * * * *